(12) United States Patent
Dempsey

(10) Patent No.: US 8,190,730 B2
(45) Date of Patent: May 29, 2012

(54) LOCATION SYSTEM AND METHODS

(75) Inventor: Michael K. Dempsey, Westford, MA (US)

(73) Assignee: Consortium P, Inc., Rochester, NH (US)

( * ) Notice: Subject to any disclaimer, the term of this patent is extended or adjusted under 35 U.S.C. 154(b) by 2093 days.

(21) Appl. No.: 10/096,036

(22) Filed: Mar. 11, 2002

(65) Prior Publication Data

US 2002/0198986 A1    Dec. 26, 2002

Related U.S. Application Data

(60) Provisional application No. 60/274,544, filed on Mar. 9, 2001.

(51) Int. Cl.
*G06F 15/173* (2006.01)

(52) U.S. Cl. ..... 709/224; 709/201; 340/571; 340/572.1; 455/404.2; 455/7; 455/9; 342/450; 342/463

(58) Field of Classification Search ............ 340/571, 340/572.1; 455/404.2, 7, 9; 342/450, 463; 709/201, 224

See application file for complete search history.

(56) References Cited

U.S. PATENT DOCUMENTS

| | | | |
|---|---|---|---|
| 4,151,407 A | 4/1979 | McBride et al. | 250/199 |
| 4,225,953 A | 9/1980 | Simon et al. | 367/117 |
| 4,275,385 A | 6/1981 | White | 340/312 |
| 4,462,022 A | 7/1984 | Stolarczyk | 340/506 |
| 4,471,345 A | 9/1984 | Barrett, Jr. | 340/572 |
| 4,495,496 A | 1/1985 | Miller, III | 340/825.54 |
| 4,549,264 A | 10/1985 | Carroll et al. | 364/406 |
| 4,598,272 A | 7/1986 | Cox | 340/539 |
| 4,598,275 A | 7/1986 | Ross et al. | 340/573 |
| 4,601,064 A | 7/1986 | Shipley | 455/608 |
| 4,649,385 A | 3/1987 | Aires et al. | 379/57 |
| 4,656,463 A | 4/1987 | Anders et al. | 340/572 |
| 4,682,155 A | 7/1987 | Shirley | 340/573 |

(Continued)

FOREIGN PATENT DOCUMENTS

WO    WO 00/69198 A1    11/2000

(Continued)

OTHER PUBLICATIONS

Girling, G. et al. The design and implementation of a low power ad hoc protocol stack. ATT Laboratories Cambridge. http://www.uk.research.att.com:/pub/docs/att/tr.2000.13.pdf (Sep. 2000).

(Continued)

*Primary Examiner* — Dohm Chankong
(74) *Attorney, Agent, or Firm* — Maine Cernota & Rardin

(57) ABSTRACT

In one embodiment of the invention, a location system is provided using both RF and IR signals for the determination of an object. Another embodiment of the invention provides a direct network connection for a receiver. The direct connection may be provided for connection to an Ethernet network, a telephone network, a cable TV network, a UTP network, a Universal Serial Bus (USB), a medical telemetry network or the Internet. A web server is optionally provided according to an embodiment of the invention. According to a further embodiment, a fixed location identifier is provided to receive signals from a transmitter and then transmit a signal to a receiver, which may be connected to a network. According to a further embodiment, two identifiers may be transmitted, one identifier corresponding to an object, while a second identifier identifies a group designator of the object.

17 Claims, 15 Drawing Sheets

U.S. PATENT DOCUMENTS

| | | | |
|---|---|---|---|
| 4,709,330 A | 11/1987 | Yokoi et al. ............... 364/400 |
| 4,814,751 A | 3/1989 | Hawkins et al. ............. 340/573 |
| 4,868,859 A | 9/1989 | Sheffer ........................ 379/39 |
| 4,906,853 A | 3/1990 | Linwood et al. ............. 250/551 |
| 4,916,444 A | 4/1990 | King ....................... 340/825.49 |
| 4,924,211 A | 5/1990 | Davies ......................... 340/573 |
| 4,952,913 A | 8/1990 | Pauley et al. ................. 340/573 |
| 4,952,928 A | 8/1990 | Carroll et al. ............. 340/825.54 |
| 4,955,000 A | 9/1990 | Nastrom ...................... 367/117 |
| 4,958,645 A | 9/1990 | Cadell et al. ................. 128/903 |
| 4,982,176 A | 1/1991 | Schwarz ....................... 340/567 |
| 5,014,040 A | 5/1991 | Weaver et al. ............... 340/572 |
| 5,017,794 A | 5/1991 | Linwood et al. ............. 250/551 |
| 5,027,314 A | 6/1991 | Linwood et al. ............. 364/900 |
| 5,027,383 A | 6/1991 | Sheffer .......................... 379/39 |
| 5,062,151 A | 10/1991 | Shipley ......................... 359/154 |
| 5,103,108 A | 4/1992 | Crimmins ................... 250/338.1 |
| 5,119,104 A | 6/1992 | Heller ........................... 342/450 |
| 5,131,019 A | 7/1992 | Sheffer et al. .................. 379/39 |
| 5,194,856 A | 3/1993 | Zijlstra .................... 340/825.35 |
| 5,218,344 A | 6/1993 | Ricketts ....................... 340/573 |
| 5,228,449 A | 7/1993 | Christ et al. ................... 128/691 |
| 5,276,496 A | 1/1994 | Heller et al. .................. 356/141 |
| 5,283,549 A | 2/1994 | Mehaffey et al. ............. 340/521 |
| 5,301,353 A | 4/1994 | Borras et al. ....................... 455/9 |
| 5,317,309 A | 5/1994 | Vercellotti et al. ........ 340/825.54 |
| 5,319,191 A | 6/1994 | Crimmins .................. 250/214 R |
| 5,355,222 A | 10/1994 | Heller et al. .................. 356/375 |
| 5,363,425 A | 11/1994 | Mufti et al. ..................... 379/38 |
| 5,382,948 A | 1/1995 | Richmond ............... 340/825.36 |
| 5,387,993 A | 2/1995 | Heller et al. .................. 359/155 |
| 5,402,469 A | 3/1995 | Hopper et al. ................. 379/93 |
| 5,416,468 A | 5/1995 | Baumann ...................... 340/573 |
| 5,426,425 A | 6/1995 | Conrad et al. ........... 340/825.49 |
| 5,440,559 A | 8/1995 | Gaskill ......................... 370/95.1 |
| 5,455,851 A | 10/1995 | Chaco et al. ................... 379/38 |
| 5,458,123 A | 10/1995 | Unger ........................... 128/696 |
| 5,465,082 A | 11/1995 | Chaco ....................... 340/825.54 |
| 5,479,408 A | 12/1995 | Will ............................. 370/94.1 |
| 5,485,634 A | 1/1996 | Weiser et al. ................. 455/53.1 |
| 5,493,283 A | 2/1996 | Hopper et al. ............ 340/825.34 |
| 5,493,692 A | 2/1996 | Theimer et al. ............. 455/26.1 |
| 5,512,879 A | 4/1996 | Stokes ........................... 340/573 |
| 5,521,902 A | 5/1996 | Ferguson ........................ 370/13 |
| 5,544,321 A | 8/1996 | Theimer et al. ........... 395/200.11 |
| 5,548,637 A | 8/1996 | Heller et al. .................. 379/201 |
| 5,555,376 A | 9/1996 | Theimer et al. ........... 395/200.09 |
| 5,561,412 A | 10/1996 | Novak et al. ............. 340/286.07 |
| 5,568,963 A | 10/1996 | Bennett et al. ................ 353/122 |
| 5,570,079 A | 10/1996 | Dockery ........................ 340/541 |
| 5,572,195 A | 11/1996 | Heller et al. .............. 340/825.35 |
| 5,578,989 A | 11/1996 | Pedtke .......................... 340/539 |
| 5,594,786 A | 1/1997 | Chaco et al. .................... 379/93 |
| 5,603,054 A | 2/1997 | Theimer et al. .............. 395/826 |
| 5,610,589 A | 3/1997 | Evans et al. ................... 340/573 |
| 5,611,050 A | 3/1997 | Theimer et al. ........... 395/200.09 |
| 5,621,384 A | 4/1997 | Crimmins et al. ............ 340/539 |
| 5,627,517 A | 5/1997 | Theimer et al. ............... 340/572 |
| 5,633,875 A | 5/1997 | Hershey et al. ............... 370/346 |
| 5,661,471 A * | 8/1997 | Kotlicki ......................... 340/531 |
| 5,661,492 A * | 8/1997 | Shoap et al. ................... 342/465 |
| 5,673,032 A | 9/1997 | Ono ......................... 340/825.44 |
| 5,689,229 A | 11/1997 | Chaco et al. ............. 340/286.07 |
| 5,742,233 A | 4/1998 | Hoffman et al. .............. 340/573 |
| 5,774,876 A | 6/1998 | Woolley et al. ................. 705/28 |
| 5,790,974 A | 8/1998 | Tognazzini ................... 701/204 |
| 5,793,630 A | 8/1998 | Theimer et al. .......... 364/140.01 |
| 5,812,865 A | 9/1998 | Theimer et al. ............... 395/800 |
| 5,818,385 A * | 10/1998 | Bartholomew ................ 342/372 |
| 5,822,418 A | 10/1998 | Yacenda et al. ............... 379/201 |
| 5,822,544 A | 10/1998 | Chaco et al. .................. 395/202 |
| 5,826,195 A | 10/1998 | Westerlage et al. ........... 455/456 |
| 5,838,223 A | 11/1998 | Gallant et al. ............ 340/286.07 |
| 5,844,482 A | 12/1998 | Guthrie et al. ................ 340/568 |
| 5,892,441 A * | 4/1999 | Woolley et al. ........... 340/539.26 |
| 5,903,373 A | 5/1999 | Welch et al. .................. 359/152 |
| 5,917,425 A | 6/1999 | Crimmins et al. ........ 340/825.49 |
| 5,929,848 A | 7/1999 | Albukerk et al. ............. 345/326 |
| 5,956,725 A | 9/1999 | Burroughs et al. ............ 707/101 |
| 5,959,568 A * | 9/1999 | Woolley ........................... 342/42 |
| 5,977,913 A | 11/1999 | Christ ............................ 342/465 |
| 5,991,771 A | 11/1999 | Fulls et al. .................... 707/202 |
| 6,009,333 A | 12/1999 | Chaco ........................... 455/456 |
| RE36,530 E | 1/2000 | Heller et al. ................... 359/155 |
| 6,011,487 A | 1/2000 | Plocher .................... 340/825.49 |
| 6,034,622 A | 3/2000 | Levine ...................... 340/825.54 |
| 6,040,774 A | 3/2000 | Schepps ..................... 340/572.1 |
| 6,075,433 A | 6/2000 | Ono et al. ...................... 336/212 |
| 6,075,443 A | 6/2000 | Schepps et al. ............. 340/573.4 |
| RE36,791 E | 7/2000 | Heller ........................... 342/450 |
| 6,085,240 A | 7/2000 | Suzuki et al. ................. 709/223 |
| 6,088,586 A | 7/2000 | Haverty ......................... 455/422 |
| 6,091,956 A | 7/2000 | Hollenberg ................... 455/456 |
| 6,104,295 A | 8/2000 | Gaisser et al. .............. 340/573.4 |
| 6,122,520 A | 9/2000 | Want et al. .................... 455/456 |
| 6,141,584 A | 10/2000 | Rockwell et al. .................. 607/5 |
| 6,150,921 A | 11/2000 | Werb et al. ................... 340/10.1 |
| 6,154,139 A | 11/2000 | Heller ......................... 340/573.4 |
| 6,154,676 A | 11/2000 | Levine ............................. 607/58 |
| 6,160,481 A * | 12/2000 | Taylor, Jr. ................... 340/573.4 |
| 6,169,484 B1 | 1/2001 | Schuchman et al. ........ 340/573.1 |
| 6,175,308 B1 * | 1/2001 | Tallman et al. .......... 340/539.11 |
| 6,181,933 B1 | 1/2001 | Jeong ............................ 455/432 |
| 6,211,790 B1 | 4/2001 | Radomsky et al. ........ 340/573.4 |
| 6,222,440 B1 | 4/2001 | Heller ........................... 340/10.3 |
| 6,222,484 B1 | 4/2001 | Seiple et al. .............. 342/357.09 |
| 6,236,335 B1 | 5/2001 | Goodwin, III ........... 340/825.49 |
| 6,237,051 B1 | 5/2001 | Collins ............................ 710/36 |
| 6,249,252 B1 | 6/2001 | Dupray ......................... 342/450 |
| 6,259,355 B1 | 7/2001 | Chaco et al. .............. 340/286.07 |
| 6,259,404 B1 | 7/2001 | Parl et al. ...................... 342/457 |
| 6,259,405 B1 * | 7/2001 | Stewart et al. ................ 342/457 |
| 6,281,811 B1 | 8/2001 | Ranzino ........................ 340/988 |
| 6,285,321 B1 | 9/2001 | Stilp et al. ..................... 342/465 |
| 6,286,044 B1 | 9/2001 | Aoyama ....................... 709/223 |
| 6,292,744 B1 | 9/2001 | Want et al. .................... 701/207 |
| 6,317,082 B1 | 11/2001 | Bacon et al. .................. 342/465 |
| 6,317,604 B1 | 11/2001 | Kovach, Jr. et al. .......... 455/456 |
| RE37,531 E | 1/2002 | Chaco et al. .................... 379/38 |
| 6,344,794 B1 | 2/2002 | Ulrich et al. .................. 340/539 |
| 6,351,235 B1 | 2/2002 | Stilp ......................... 342/357.06 |
| 6,353,406 B1 | 3/2002 | Lanzl et al. ................... 342/118 |
| 6,363,525 B1 | 3/2002 | Dougherty et al. ............. 725/34 |
| 6,373,389 B1 | 4/2002 | Przygoda, Jr. et al. ..... 340/572.4 |
| 6,380,894 B1 | 4/2002 | Boyd et al. ................... 342/450 |
| 6,388,618 B1 | 5/2002 | Stilp et al. ..................... 342/457 |
| 6,405,102 B1 | 6/2002 | Swartz et al. ................. 700/225 |
| 6,473,038 B2 * | 10/2002 | Patwari et al. ................ 342/450 |
| 6,512,478 B1 * | 1/2003 | Chien ....................... 342/357.09 |
| 6,539,393 B1 * | 3/2003 | Kabala .......................... 707/102 |
| 6,574,482 B1 | 6/2003 | Radomsky et al. ........... 455/517 |
| 6,970,097 B2 * | 11/2005 | Welles et al. ................... 340/8.1 |
| 6,970,183 B1 * | 11/2005 | Monroe ......................... 348/143 |
| 6,995,654 B2 * | 2/2006 | Nysen ............................. 340/7.1 |
| 2001/0000958 A1 | 5/2001 | Ulrich et al. .................. 340/539 |
| 2001/0011954 A1* | 8/2001 | Shelton et al. ............ 340/825.49 |
| 2001/0022558 A1 | 9/2001 | Karr, Jr. et al. ............... 342/450 |
| 2001/0035823 A1 | 11/2001 | Curwen et al. ............. 340/573.4 |
| 2001/0049629 A1 | 12/2001 | Freeman ......................... 705/23 |
| 2002/0039067 A1 | 4/2002 | Eubanks ..................... 340/573.1 |
| 2002/0039080 A1 | 4/2002 | Wisherd et al. ............... 342/463 |
| 2002/0042278 A1 | 4/2002 | Crockett et al. .............. 455/456 |
| 2002/0080759 A1 | 6/2002 | Harrington et al. ........... 370/338 |
| 2002/0086640 A1 | 7/2002 | Belcher et al. .................. 455/63 |
| 2002/0089450 A1* | 7/2002 | Dowdle et al. ................ 342/453 |
| 2002/0094012 A1 | 7/2002 | Belcher ......................... 375/130 |
| 2002/0097182 A1 | 7/2002 | Goren et al. ............. 342/357.07 |
| 2002/0122055 A1* | 9/2002 | Parupudi et al. .............. 345/737 |
| 2002/0123672 A1* | 9/2002 | Christophersom et al. ... 600/300 |
| 2002/0167417 A1* | 11/2002 | Welles et al. ............. 340/825.49 |

FOREIGN PATENT DOCUMENTS

| | | |
|---|---|---|
| WO | WO 01/15070 A2 | 3/2001 |
| WO | WO 01/15070 A3 | 3/2001 |
| WO | WO 01/29574 A2 | 4/2001 |
| WO | WO 01/29574 A3 | 4/2001 |

| | | |
|---|---|---|
| WO | WO 01/33749 A1 | 5/2001 |
| WO | WO 01/35552 A1 | 5/2001 |
| WO | WO 01/95278 A1 | 12/2001 |

OTHER PUBLICATIONS

Harter, A. et al. A distributed location system for the active office. (Nov. 1993) pp. 1-17 Olivetti Research Limited, Cambridge England. http://www.uk.research.att.com/pub/docs/att/tr.94.1.pdf.

Harter, A. et al. The anatomy of a context-aware application. Proc. ACM/IEEE MOBICOM Seattle, WA. (Aug. 1999) pp. 59-68.

Hightower, J. Investigating an indoor 3D location sensing technology based on RF signal strength. Ph.D. Qualifying Exam Presentation for the University of Washington (Dec. 8, 1999) slides 1-23; pp. 1-12 http://www.cs.washington.edu/homes/jeffro/pubs/spoton_quals99/spoton_quals99.pdf.

Hightower, J. et al. SpotON: An indoor 3D location sensing technology based on RF signal strength. UW CSE Technical Report #2000-02-02, University of Washington, Seattle, WA (Feb. 18, 2000) pp. 1-16.

Hopper, A. The Royal Society Clifford Paterson Lecture (1999) Sentient computing. pp. 1-10 http://www.uk.research.att.com/pub/docs/att/tr.1999.12.pdf.

Priyantha, N. et al. The cricket location-support system. $6^{th}$ ACM International Conference on Mobile Computing and Networking (ACM MOBICOM), Boston, MA (Aug. 2000).

Want, R. et al. Personal interactive computing objects. Olivetti Research Ltd. Cambridge, England. (May 26, 1999) http://www.uk.research.att.com/pub/docs/att/tr.92.2.pdf.

Want, R. et al. The active badge location system. ACM Transactions on Information Systems 10 (Jan. 1992) pp. 91-102.

Want, R. et al. An overview of the PARCTAB ubiquitous computing experiment. IEEE Personal Communications (Dec. 1995) 2(6):28-43.

Want, R. et al. Activating everyday objects. Proceedings of the 1998 DARPA/NIST Smart Spaces Workshop, NIST, Gaithersburg, Maryland (Jul. 30-31, 1998) pp. 7-140-7-143.

Chakraborty, A. A distributed architecture for mobile, location-dependent applications. MIT Master's thesis. Computer Science and Engineering (May 2000).

Dertouzos, M. The future of computing. Scientific American (Aug. 1999) p. 1-6.

Gibbs, W. As we may live. Scientific American (Nov. 2000) pp. 39-40.

Borriello, G. et al. Embedded computation meets the world-wide web. Submitted to Communications of the ACM, Dec. 1999. http://www.nano.xerox.com/want/vita.htm#Publications.

Bulusu, N. et al. GPS-less low-cost outdoor localization for very small devices. University of Southern California. IEEE Personal Communications (Oct. 2000) pp. 28-34.

Castro, P. et al. A probabilistic room location service for wireless networked environments. (Oct. 16, 2001) pp. 18-34 http://link.springer.de/link/service/series/0558/bibs/2201/22010018.htm.

Bahl, P. et al. RADAR: An in-building RF-based user location and tracking system. IEEE INFOCOM Tel-Aviv, Israel (Mar. 2000) pp. 775-784.

Want, R. et al. Bridging physical and virtual worlds with electronic tags. Proceeding of ACM SIGCHI (May 1999) Pittsburgh pp. 370-377.

Want, R. et al. Ubiquitous electronic tagging. Submitted to IEEE Concurrency, Dec. 1999 pp. 1-6 http://www.nano.xerox.com/want/papers/ubitags-con-2000R1.pdf.

Ward, A. et al. A new location technique for the active office. IEEE Personal Communications (Oct. 1997) 4(5):42-47.

Weatherall, J. et al. Predator: A distributed location service and example applications. ATT Laboratories Cambridge England. (Sep. 16, 1999) pp. 1-14 http://www.uk.research.att.com/pub/docs/att/tr.1999.5.pdf.

* cited by examiner

United States Patent

LOCATION SYSTEM AND METHODS

REFERENCE TO RELATED APPLICATIONS

The present invention claims priority to U.S. Provisional Patent Application, Ser. No. 60/274,544, filed Mar. 9, 2001, entitled Location System and incorporated herein by reference.

TECHNICAL FIELD

The present invention relates to determining a location of one or more objects.

BACKGROUND

The determination of a location of objects has been accomplished in the art by the use of a device attached to the object.

SUMMARY

In one embodiment of the invention, a location system is provided using both RF and IR signals for the determination of a location of an object. Another embodiment of the invention provides a direct network connection for a receiver. The direct connection may be provided for connection to an Ethernet network, a telephone network, a cable TV network, a UTP network, a Universal Serial Bus (USB), a medical telemetry network or the Internet. A web server is optionally provided according to an embodiment of the invention.

According to a further embodiment, a fixed location identifier is provided to receive signals from a transmitter and then transmit a signal to a receiver, which may be connected to a network. According to a further embodiment, two identifiers may be transmitted, one identifier corresponding to an object, while a second identifier identifies a group designator of the object.

According to one embodiment, a location system is provided having a first object identifier adapted to transmit an RF signal and an IR signal and a location determining module suitable for using the IR signal and the RF signal to determine a location of at least one of the group of the first object identifier and the location determining module.

A further embodiment provides a location system having a transmitter adapted to transmit a location signal. A receiver is adapted to receive the location signal, wherein the receiver includes an interface adapted to directly couple the receiver to an Ethernet network. The location signal is used to determine a location of at least one of the group of said transmitter and said receiver.

Another embodiment provides a location system having a transmitter adapted to transmit a location signal, a receiver adapted to receive the location signal. The receiver includes a web server adapted to provide information to a network, and the location signal is used to determine a location of at least one of the group of said transmitter and said receiver.

Another embodiment provides a location system having a transmitter adapted to transmit a location signal. A receiver is adapted to receive the location signal for the determination of a location of the transmitter. An interface is adapted to directly couple the receiver to a specialized network.

A further embodiment provides a location system having a transmitter adapted to transmit a first identifier corresponding to the transmitter and a second identifier corresponding to a group designator of the transmitter. A receiver is adapted to receive the first identifier and the second identifier. The first identifier and the second identifier are used to determine a location of at least one of the group of said transmitter and said receiver.

Another embodiment provides a location system having an object identifier adapted to transmit a first RF signal and a first IR signal. A network connection element is adapted to receive the first RF signal and the first IR signal for determining a location of at least one of the group of said object identifier and said network connection element from the first RF signal and the first IR signal.

A method of determining location is provided according to another embodiment and having the steps of transmitting a first RF signal from an object identifier. A first IR signal is transmitted from an object identifier. At least one of the first RF signal and the first IR signal is received. A location of at least one of the group of said object identifier and said network connection element is determined based on receipt of at least one of the first RF signal and the first IR signal.

Another embodiment provides a method of determining location. A first RF signal is transmitted from an object identifier. A first IR signal is transmitted from the object identifier. The first RF signal is received at a network connection element. The first IR signal is received at a network connection element. A location of at least one of the group of said transmitter and said receiver is determined by analysis of the first RF signal and the first IR signal.

Another embodiment provides a method of determining location. A first RF signal and first IR signal are transmitted from an object identifier. The first RF signal and first IR signal are received at a network connection element. The first RF signal and first IR signal are also received at a fixed location identifier. A second IR signal and second RF signal are transmitted from the fixed location identifier. The first and second IR signals and first and second RPF signals are received at a network connection element. A location of the object identifier is determined by analysis of the first RF signal the first IR signal, the second RF signal and the second IR signal.

Another embodiment provides a method of determining location. A first RF signal and first IR signal are transmitted from an object identifier. The first RF signal and first IR signal are received at a network connection element. The first RF signal and first IR signal are also received at a fixed location identifier. A second IR signal and second RF signal are transmitted from the fixed location identifier. The first and second IR signals and first and second RF signals are received at a network connection element. A location of the network connection element is determined by analysis of the first RF signal the first IR signal, the second RF signal and the second IR signal.

According to a further embodiment, a method of determining location of a transmitter is provided. A first identifier is transmitted corresponding to the transmitter. A second identifier is transmitted corresponding to a group designator of the transmitter. The first identifier and the second identifier are received. A location of at least one of the group of the transmitter and the receiver is determined based on the first identifier and the second identifier.

According to a further embodiment, a method of providing location information of an object identifier is provided. The location information is obtained. A signal is received from an input device of the object identifier. Dissemination of the location information may be prevented as requested by the signal.

According to a further embodiment, a method of providing location information of an object identifier is provided. The location information is obtained. A signal is received from an input device of the object identifier. Dissemination of the location information may be enabled as requested by the signal.

According to a further embodiment, a method of providing location information of an object identifier is provided. A signal from an input device of the object identifier is obtained. Dissemination of the location information may be prevented as requested by the signal.

According to a further embodiment, a method of providing location information of an object identifier is provided. A signal from an input device of the object identifier is obtained. Dissemination of the location information may be enabled as requested by the signal.

According to a further embodiment, a method of providing location information of an object identifier is provided. A signal from an input device of each of a plurality of object identifiers is obtained. Eligibility of information dissemination of information is established relating to each location of each of the plurality of object identifiers as requested by each of the signals corresponding to each of the object identifiers.

According to another embodiment, in a location system, the location system including a medium holding computer-executable steps for a method. A first RF signal is transmitted from an object identifier. A first IR signal is transmitted from the object identifier. The first RF signal is received at a network connection element. The first IR signal is received at a network connection element. A location of at least one of the group of the object identifier and the network connection element is determined by analysis of the first RF signal and the first IR signal.

According to another embodiment, in a location system, the location system including a medium holding computer-executable steps for a method. Another embodiment provides a method of determining location. A first RF signal and first IR signal are transmitted from an object identifier. The first RF signal and first IR signal are received at a network connection element. The first RF signal and first IR signal are also received at a fixed location identifier. A second IR signal and second RF signal are transmitted from the fixed location identifier. The first and second IR signals and first and second RF signals are received at a network connection element. A location of at least one of the group of the object identifier and the network connection element is determined by analysis of the first RF signal the first IR signal, the second RF signal and the second IR signal.

BRIEF DESCRIPTION OF THE DRAWINGS

The invention will be apparent from the description herein and the accompanying drawings, in which like reference characters refer to the same parts throughout the different views.

DETAILED DESCRIPTION

Figure 1A:
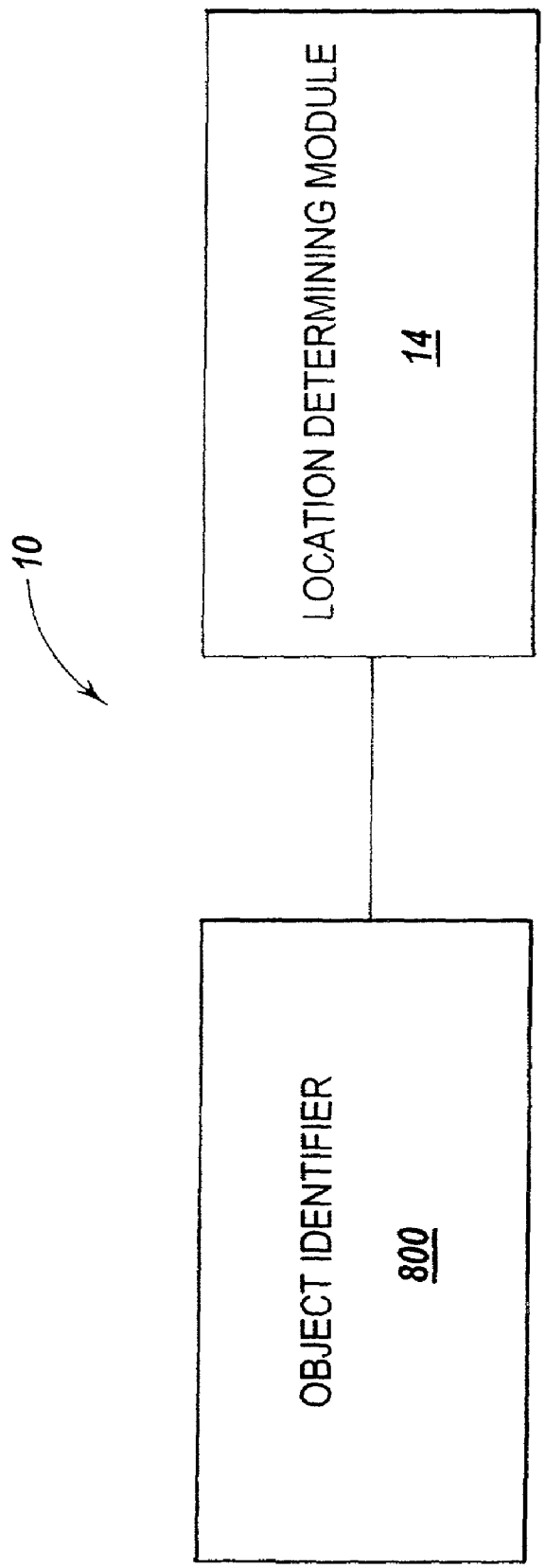
FIG. 1A illustrates a location system having an object identifier and a location determining module according to an embodiment of the invention.

Various embodiments of the present invention provide apparatus and methods for the determination of location information. Various embodiments of the invention allow for location information to communicated over a network or over the Internet. Various embodiments of the invention may be configured to minimize installation efforts by the use of various techniques such as using wireless components to provide location information to fixed locations and by an ability in some embodiments of the invention to utilize existing wiring, already in place in many environments.

A location system 10 is provided by way of example in FIG. IA. The illustrated location system 10 includes an object identifier 800 and a location determining module 14. The object identifier 800 may be coupled to an object such that a location of that object corresponds to the location of the object identifier 800. The object identifier 800 may be any device capable of identifying a location of an object. According to an embodiment of the invention, an example includes an electronic device. Examples of electronic devices may be in many forms and include, by way of example, a processor, a computer, a personal digital assistant, a communications device, such as a cell phone, a network appliance, a web server, a network, any device capable of manipulating information, a receiver, a transmitter, an interface or any combination of these devices. A network may be a local area network (LAN), a wide area network (WAN), the Internet, an intranet, or a metropolitan network. The network may be a wireless network such as a Bluetooth network, a cellular network, a GSM based network or some other type of network.

According to various embodiments of the invention, the object identifier 10 transmits two identifiers, one identifier corresponding to the object identifier 10 and a second identifier which is a group designator. While the identifiers may be in many forms, some examples, according to various embodiments of the invention, include numbers, letters, URLs, MAC addresses and IP addresses.

According to an embodiment of the invention, the location determining module 14 may include any structure suitable for determining location. Examples include any device with intelligence to determine the location of one or more object identifiers. According to various embodiments of the invention, the location determining module 14 may include one or more of each of the following, including combinations of the following: a network connection element, an object identifier, a fixed location identifier, a location resolver, a database, topology data, an electronic device, a web interface, a network interface, a specialized network interface, an implementation interface, a database interface, a network and/or a specialized network, a receiver and/or a transmitter. According to various embodiments of the invention, the location determining module 14 may have only a receiver, only a transmitter or both a receiver and a transmitter. It will be apparent to one of ordinary skill in the art that one or more components may be distributed in a wide variety of configurations.

According to various embodiments of the invention, the present invention may be used to determine a location of a location determining module. In such an embodiment, the location determining module may be a mobile module, capable of determining its own location relative to one or more object identifiers. In such an embodiment, the object identifiers may be fixed. Optionally, the object identifiers may be moving. One example of the use of a mobile location determining module involves a location system configured to determine locations within a large area. If such a large area is populated by a small number of objects, the components of such a location system may be more efficiently configured by providing functionality of a location determining module with each object. In such a case, object identifiers could be distributed throughout the large area. The location determining module could then be adapted to receive location signals from the object identifiers and thereby determine a location of the location determining module. In this embodiment, the location of the objects is determined relative to the location of the one or more object identifiers, although the locations of the object identifiers may be known, allowing locations of objects to be determined relative to other references or by name, such as a location on a map or a specific room.

The configuration above is contrasted with another embodiment of the invention, better suited to environments with a greater number of objects in a smaller area. In such an embodiment, each object may be provided with an object identifier. One or more location determining modules may then be located within the area to receive location signals transmitted by the object identifiers. In this embodiment, the location of the objects is determined by determining the location of the object identifiers.

According to various embodiments of the invention, the location determining module 14 may be capable of performing additional functionality, such as receiving requests for information, providing information, storing information, commanding actions in response to location information, associating objects with other objects or with locations, establishing privacy conditions regarding availability of location information, interfacing directly with various network types, and the like. According to further embodiments of the invention, the location determining module 14 includes multiple, distributed receivers, some of which may be connected to a network, and others not connected to a network. According to various embodiments of the invention, the object identifier 10 and location determining module 14 utilize both RF signals and IR signals for the determination of location.

According to an embodiment of the invention, the location determining module 14 may include one or more databases. The databases may store information relating to current location of object identifiers, fixed location identifiers and According to various embodiments of the invention, the invention may be used only within an enclosed structure. Enclosed structures include buildings, such as office buildings, exhibition halls, health care institutions, homes or other structures. According to other embodiments, the invention may be used outside of enclosed structures or may be used both within and outside enclosed structures.

Figure 1B:
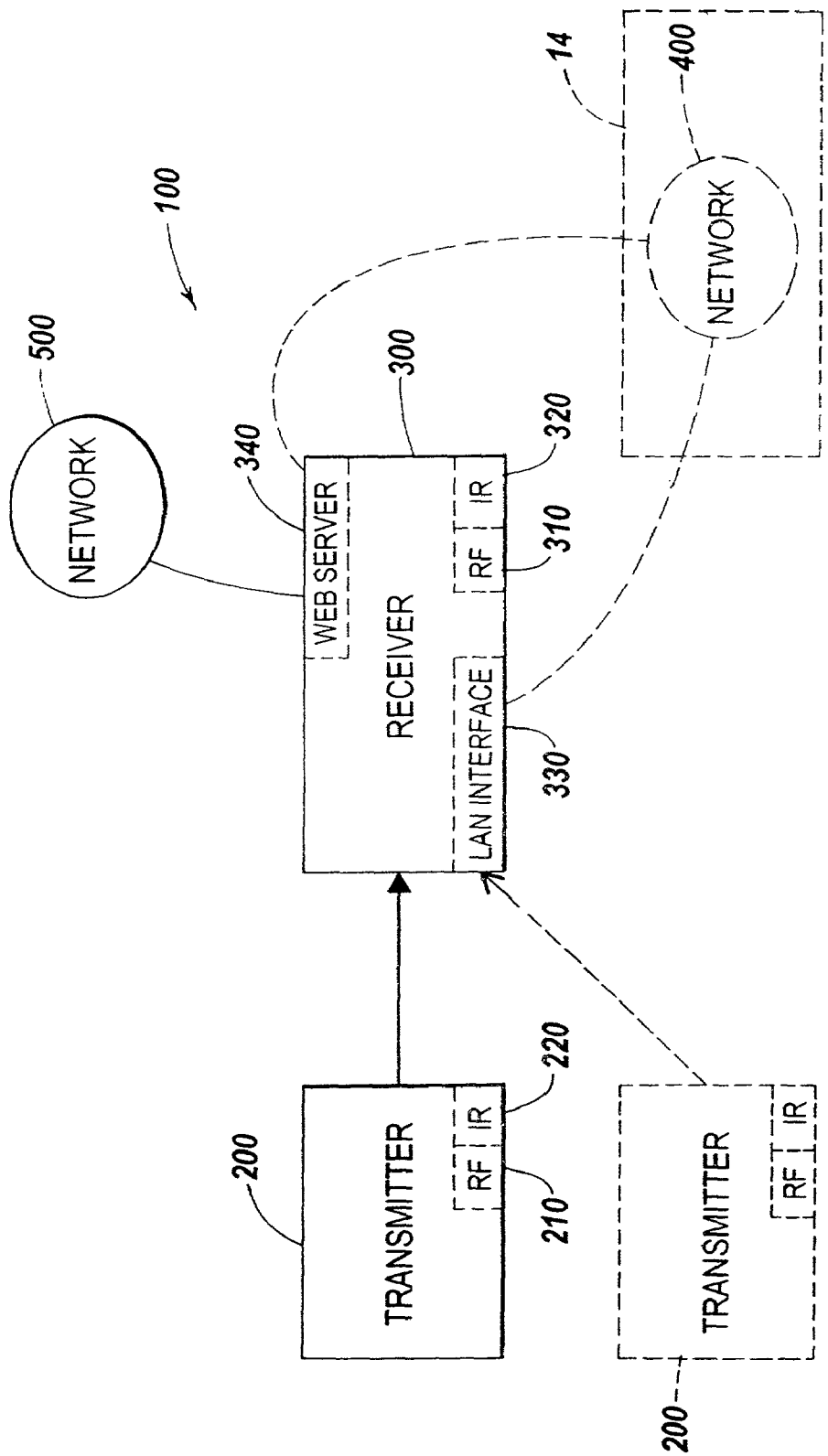
FIG. 1B illustrates a location system having a receiver and one or more transmitters according to an embodiment of the invention.

According to an embodiment of the invention, a location system 100 is provided. As illustrated by way of example in FIG. 1B, the location system 100 is provided with a transmitter 200 and a receiver 300. Optionally, additional transmitters 200 may be provided. A transmitter 200 communicates with the receiver 300 in order to provide a signal for receipt by the receiver 300. According to one embodiment of the invention, the transmitter 200 transmits using a radio frequency (RF) signal 210. In such an embodiment, the receiver 300 is provided with an RF receiver 310. According to a further embodiment of the invention, the transmitter 200 may be provided with an infra red (IR) transmitter 220. In such an embodiment the receiver 300 is provided with an IR receiver 320. According to a further embodiment of the invention the transmitter 200 is provided with both an RF transmitter 210 and an IR transmitter 220 while the receiver 300 is correspondingly provided with both an RF receiver 310 and an IR receiver 320. According to this embodiment, both the RF signal and the IR signal are used for the determination of the location of the transmitter 200.

According to a further embodiment of the invention, the receiver 300 may be provided with a network interface 330. An example of the network interface 330 includes an interface for a local area network (LAN) or another interface to allow direct coupling of the receiver 300 to a network 400. According to one embodiment of the invention the network interface 330 is comprised of an interface capable of direct coupling of the receiver to a UTP-based, Ethernet network interface. The Ethernet network may be a wired or wireless network or a combination thereof.

According to another embodiment of the invention the receiver 300 is provided with a web server 340. The web server 340 may be configured to provide location information directly to the network 400 and/or the Internet 500. The web server 340 may also be configured to allow for control or configuration of the receiver 300 through the network 400 and/or the Internet 500.

As shown by way of example, a location determining module 14, according to an embodiment of the invention, is illustrated, by way of example, as including the network 400.

Figure 2:
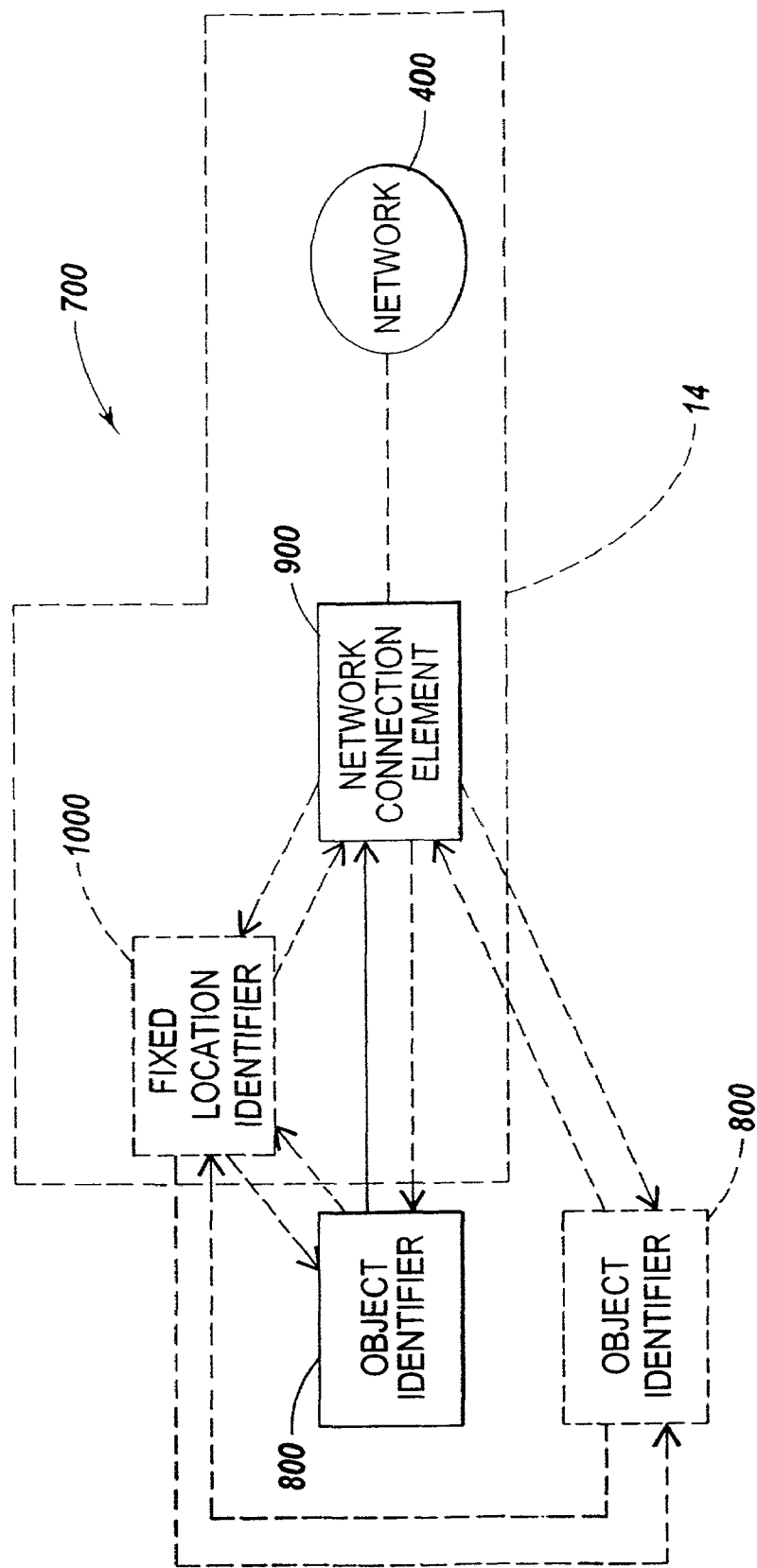
FIG. 2 illustrates a location system according to another embodiment of the invention having a network connection element, one or more object identifiers and an optional fixed location identifier.

A further embodiment of the invention is illustrated in FIG. 2. A location system 700 is illustrated by way of example having an object identifier 800 in communication with a network connection element 900. According to an embodiment of the invention, the object identifier 800 is physically coupled to an object so that the location of the object identifier 800 is considered to be the location of the object. According to another embodiment of the invention, the location of the object may be determined by locating one or more object identifiers 800 in an area and coupling a network connection element 900 to an object. In such an embodiment, the location of the network connection element 900, and hence the object, is determined relative to the one or more object identifiers 800. The network connection element 900 is configured to be coupled to a network 400. According to an optional embodiment of the invention, the network may be a wireless network. As illustrated in FIG. 2, one or more object identifiers 800 communicate to the network connection element 900. According to another embodiment of the invention, the network connection element 900 may communicate back to the object identifier 800.

According to a further embodiment of the invention a fixed location identifier 1,000 is provided. The fixed location identifier 1,000 is configured to receive signals from one or more object identifiers 800 and retransmit that information. The retransmitted information may be received by the network connection element 900. According to one embodiment of the invention the retransmitted information includes the information provided by the object identifier 800, coupled with additional information to identify the fixed location identifier 1,000 that is re-transmitting the information. According to an embodiment of the invention, plurality of network connection elements 900, fixed location identifiers 1,000 and object identifiers 800 may be provided in the location system 700. In such a case, the network 400 may provide communication among the network connection elements 900 in order to determine the location of one or more object identifiers 800 by one or more network connection elements 900 or by the use of other devices coupled to the network 400.

As shown by way of example, a location determining module 14, according to an embodiment of the invention, is illustrated, by way of example, as including the network connection element 900, the fixed location identifier 1000 and the network 400.

According to an embodiment of the invention, the object identifier 800 and/or fixed location identifier 1000 transmits various information. According to an embodiment of the invention, this information is transmitted over both RF and IR signals. Optionally, the information may be transmitted over only one signal. According to an embodiment of the invention, examples of the information transmitted may include one or all of the following: RF power level; IR power level; battery level; input device status; transmission frequency, e.g. repetition rate, for any or all types of transmissions, such as IR and/or RF; an identifier corresponding to the transmitting device; an identifier corresponding to a group to which the transmitting device is associated; any information received from another system component; status or condition information; or the like. According to an embodiment of the invention, some information may be repeated over multiple signal transmissions. Examples include transmitting input device status over ten transmissions to increase the likelihood of receipt by other components of the location system.

Figure 3:
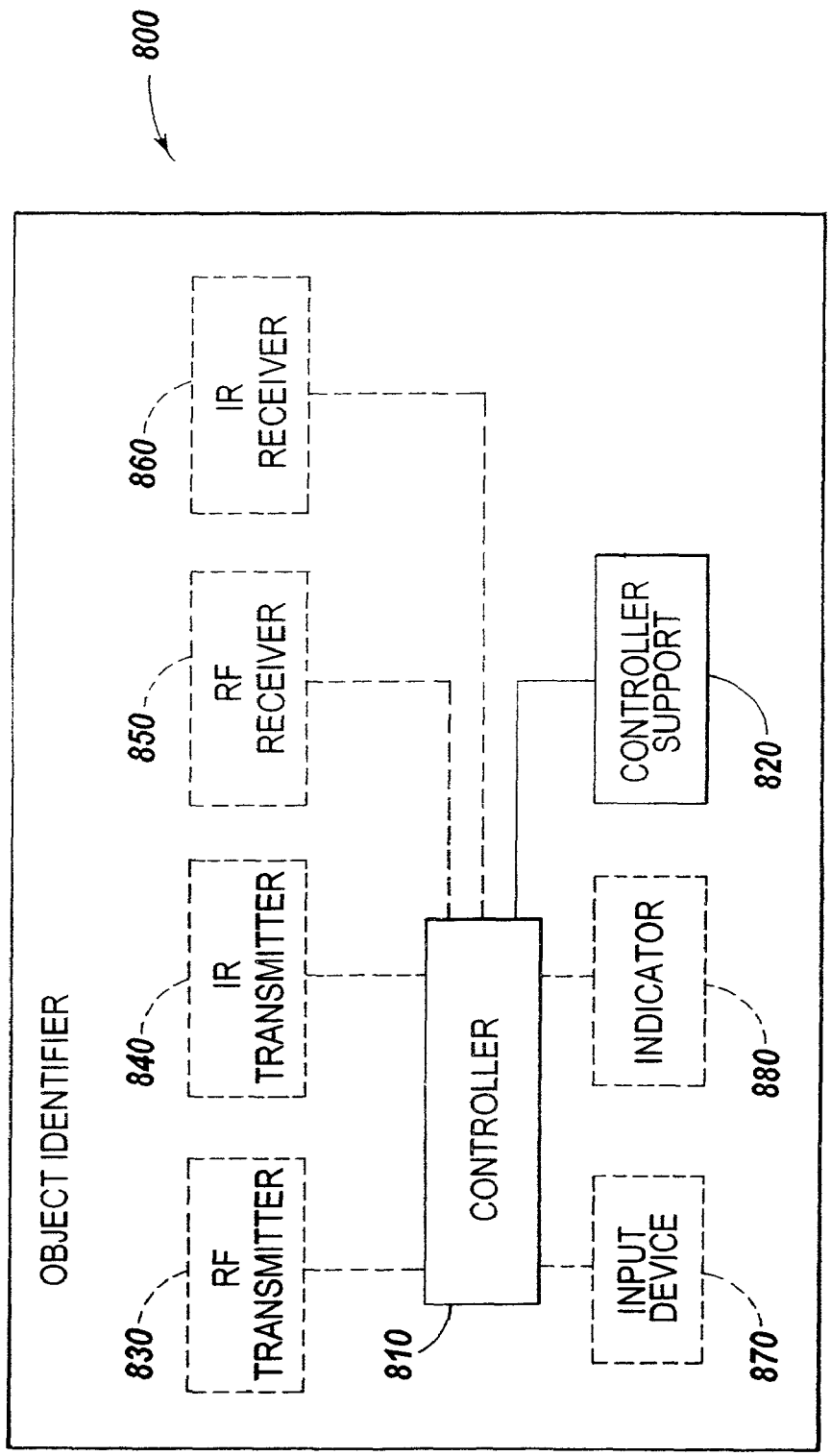
FIG. 3 illustrates a n object identifier according to an embodiment of the invention.

The object identifier 800 according to an embodiment of the invention, is illustrated by way of example in FIG. 3. The object identifier 800 is provided with a controller 810 and controller support 820. The controller support 820 may include various items such as a power supply, such as a battery or other apparatus to provide electrical power, memory and/or various time keeping circuitry such as an oscillator. Controller support 920 may optionally include non-volatile memory. Various components of the controller support 820 may optionally be incorporated into the controller 810 or may be provided from an external source, outside the object identifier 800.

According to an embodiment of the invention, the object identifier 800 may be provided with an RF transmitter 830. According to a further embodiment of the invention the object identifier 800 may be provided with an IR transmitter 840. According to an further embodiment of the invention the object identifier 800 is provided with both an RF transmitter 830 and an IR transmitter 840.

According to another embodiment of the invention, the object identifier 800 is provided with an RF receiver 850. According to another embodiment of the invention the object identifier may be provided with an IR receiver 860.

The object identifier 800 may also be provided with an input device 870. Examples of input devices include buttons, switches, keypads, ports for electrical or optical communication with other devices, sensors, such as photo cells cameras or microphones. Other types of input devices 870 may be apparent to one of ordinary skill in the art upon reading this disclosure and are to be considered within the scope of the invention. One or more input devices 870 are configured to provide input to the controller 810 in order to allow the controller 810 to take an action, not take an action, or to forward information outside the object identifier 800 by way of an RF transmitter 830 and/or an IR transmitter 840.

According to a further embodiment of the invention an indicator 880 may be provided to enable the controller 810 to output information in the proximity of the object identifier 800. Examples of indicators 880 include visual, audio and vibrational devices. Examples of these include buzzers, bells, horns, LEDs, other forms of lights and/or displays. The indicator 880 may be configured to display or output information determined by the controller 810 or received by the controller 810 through the input device 870, RF receiver 850 and/or the IR receiver 860.

Figure 4:
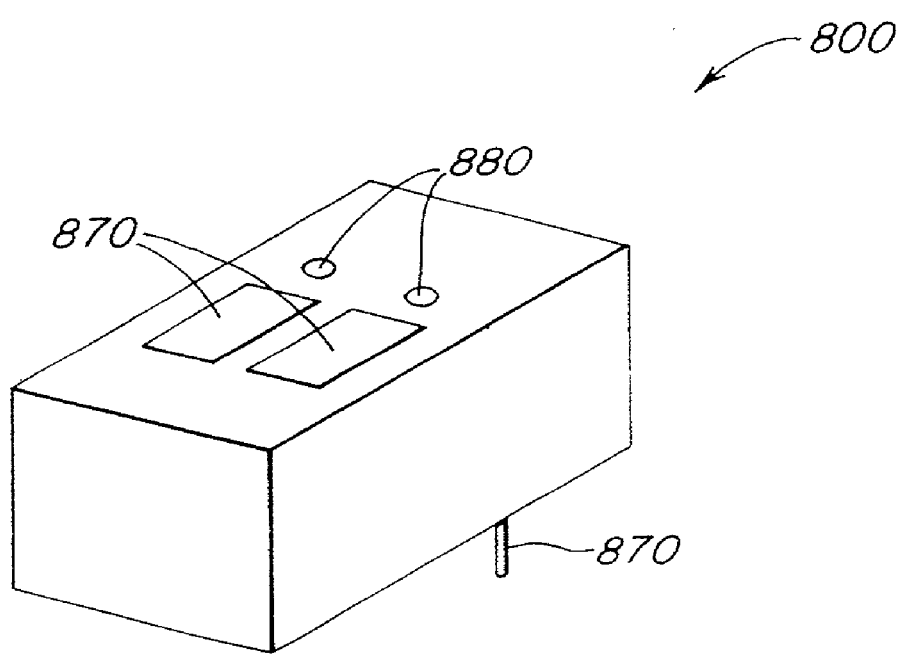
FIG. 4 is a perspective view of an object identifier according to an embodiment of the invention.

An object identifier 800 is illustrated by way of example according an embodiment of the invention, in FIG. 4. The object identifier 800 is illustrated with two indicators 880 in the form of two LEDs. Three input devices 870 are also illustrated in the form of switches. Two switches are illustrated so as to correspond to the two indicators 880, while the third switch 870 is illustrated on an opposing surface of the object identifier 800. According to this illustrative embodiment, the input device 870 on the lower surface of the object identifier 800 is normally pushed in when the object identifier 800 is attached to an object. Upon removal from the object, the input device 870 extends, resulting in a change of position of the input device 870. This embodiment allows the controller 810 to be alerted when the object identifier 800 is removed from an object. Each of the indicators 880 may be configured to illuminate upon the activation of the corresponding switches, input devices 870, so as to allow visual confirmation of the activation of one of the switches. Various uses of these switches will become apparent to one of ordinary skill in the art. Several examples, by way of illustration, include panic alerts, causing the processor 810 to emit a specialized signal through at least one of the RF transmitter 830 and the IR transmitter 840. A further example may involve an ability to configure a portion of the location system 700 remotely by the activation of the input devices 870.

Figure 5A:
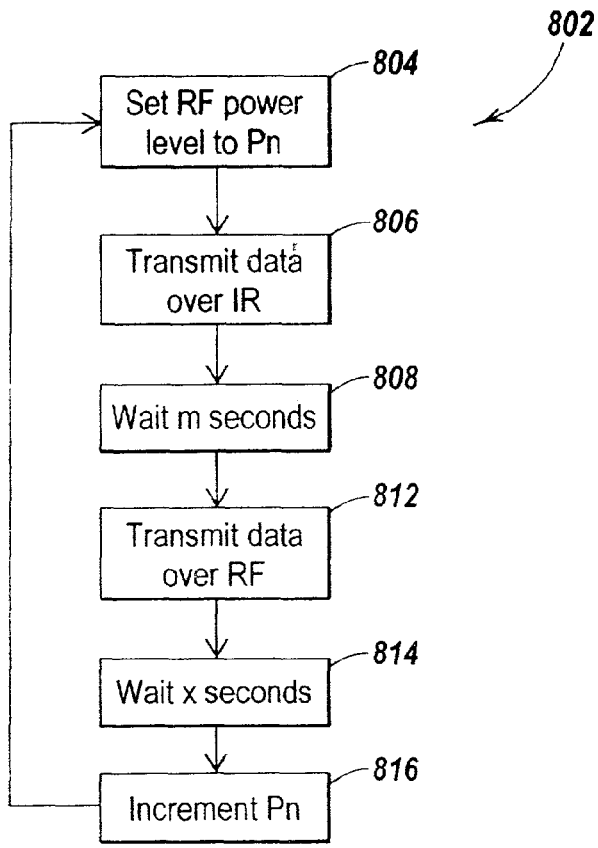
FIGS. 5A-5C illustrate various methods of operation of an object identifier according to various embodiments of the invention.
Figure 5B:
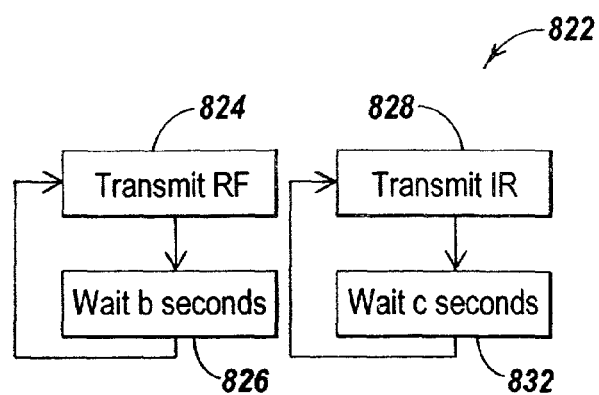
Figure 5C:
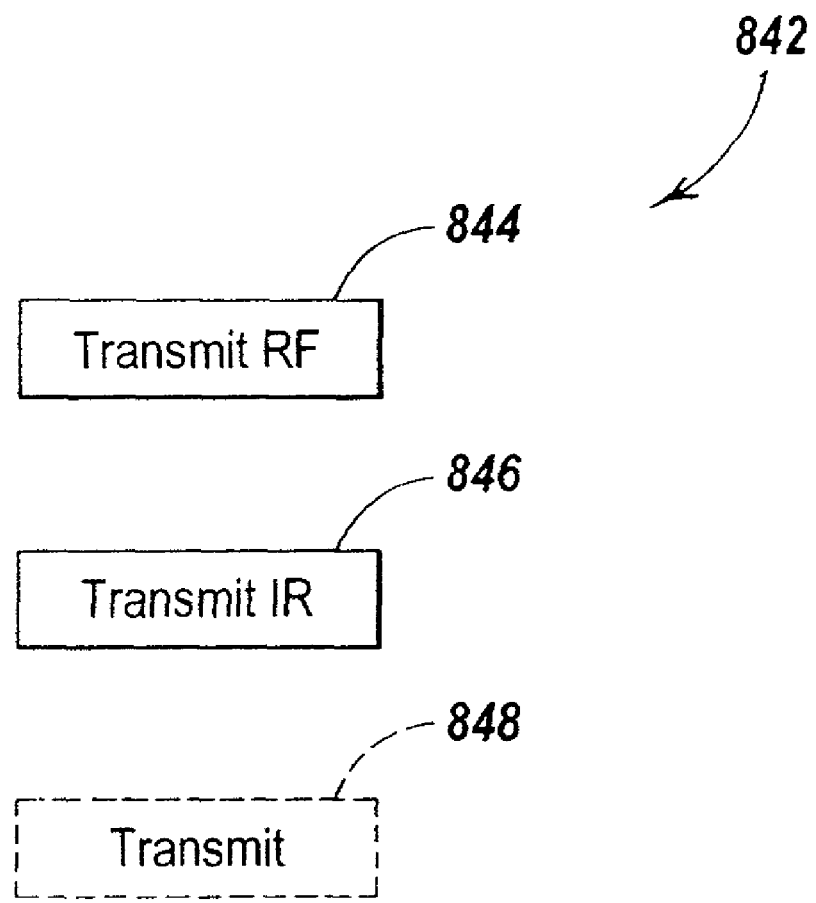

FIGS. 5A, 5B and 5C illustrate, according to various embodiments of the invention, various examples of a transmission of signals from the object identifier 800. A first method 802 is illustrated in FIG. 5A according to an embodiment of the invention. An RF power level is set to PN, step 804. An IR signal is transmitted, step 806 the delay of m seconds occurs step 808. An RF signal is transmitted, step 812. A further delay of x seconds occurs, step 814. PN is then incremented, step 816. This method 802 provides a substantially consistent IR power level, while varying an RF power level. Varying the RF power level may assist in determining a location of the object identifier 800 by enabling the network connection element 900 to receive less than all of the RF signals. According to an embodiment of the invention, one or both of the IR and RF signals are also transmitting information. Examples of this information may include the signal strength being transmitted, the period between transmissions, the length of time of the transmissions, various identifiers, corresponding to the object identifier 800, information received from one or more input devices 870 and/or various status information, such as those pertaining to the controller 810 controller sport 820 or other components of the object identifier 800. According to one embodiment of the invention the RF signal is transmitted every ten seconds and the IR signal is transmitted every twenty seconds.

Determination of the frequency and length of the transmissions involves considerations including battery life precision of location, frequency of updates to location, interference among signal transmissions and network traffic.

A further method 822 of an embodiment of the invention is illustrated in FIG. 5B. According to this embodiment, an RF signal is transmitted, step 824 and a delay, step 826 occurs before the next transmission of an RF signal, step 824. Independently of the RF transmission, an IR signal is transmitted, step 828. The IR transmission, step 828 may occur simultaneously with the transmission of the RF signal, step 824 but this embodiment of the invention is not so limited. The transmission of the RF signal, step 828 may occur at any time relative to the transmission of the RF signal step 824. A delay of c seconds step 832, occurs before the next transmission of the RF signal, 828.

According to a further embodiment of the invention, a further method 842 is illustrated by way of example in FIG. 5C. According to this embodiment, an RF signal is transmitted, step 844 and an IR signal is transmitted, step 846. According to an alternative embodiment, a transmission in another medium may also occur, step 848. Examples of other mediums include ultra-sonic (US), visual light, or audible sound. According to the method 842 of FIG. 5C, transmissions may be continuous, variable or occur at regular intervals. The transmissions among various mediums may be synchronized or random relative to transmissions in other mediums.

Figure 6:
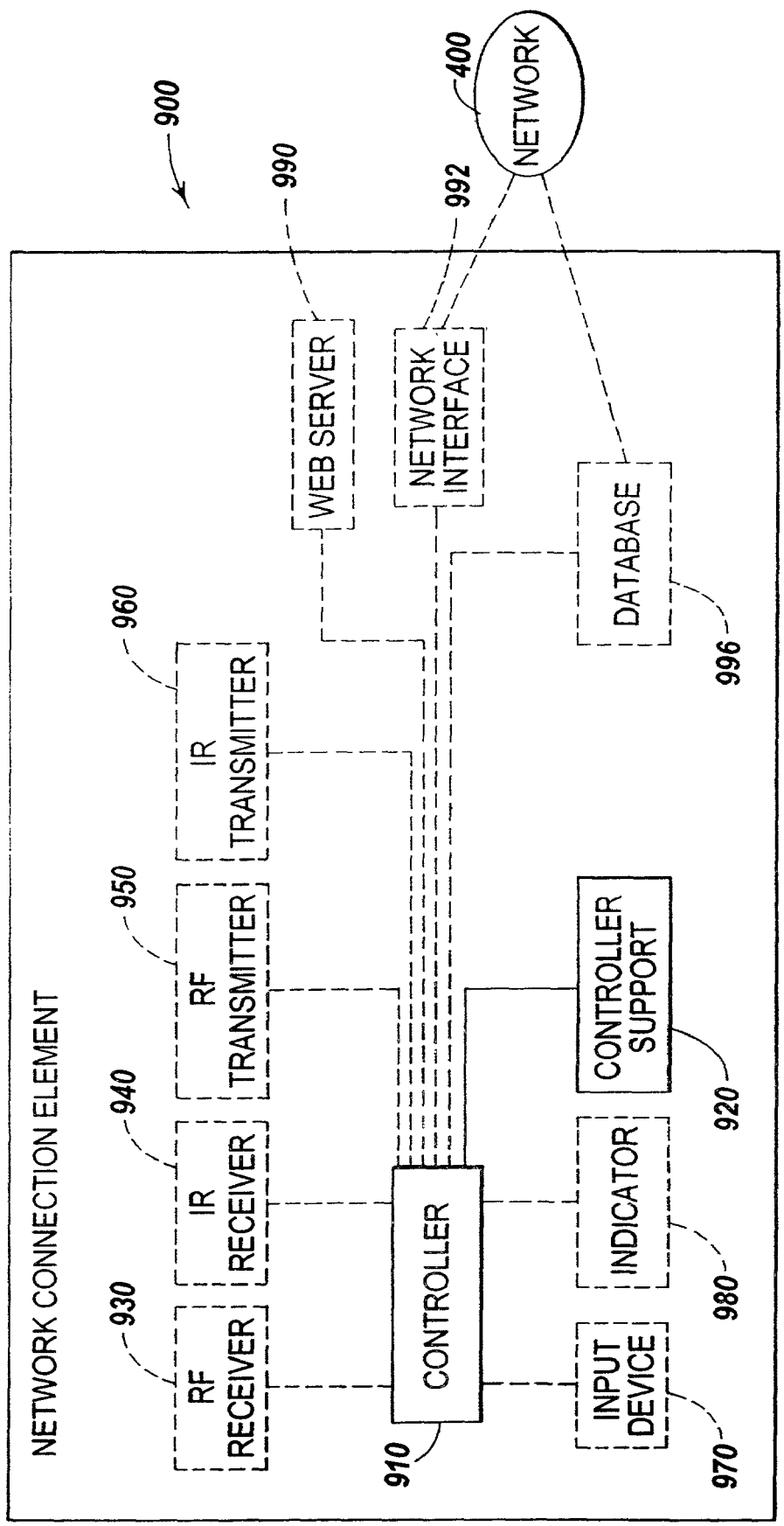
FIG. 6 illustrates a network connection element according to an embodiment of the invention.

An example of a network connection element 900 according to an embodiment of the invention is illustrated in FIG. 6. A network connection element 900 includes many component similar to those of the object identifier 800 illustrated by way of example in FIG. 3. A network connection element 900 is provided with a controller 910 and a controller support 920. Controller support 920 may optionally include nonvolatile memory. Optionally, various embodiments of the invention may include one or more of the following in the network connection element 900: an RF receiver 930, an IR receiver 940, an RF transmitter 950, an IR transmitter 960, an input device 970 and/or an indicator 980.

The network connection element 900 is adapted to receive signals from the object identifier 800. According to an embodiment of the invention, the network connection element 900 contains hardware and software capable of receiving signals from other components of the location system, such as object identifiers 900, other network connection elements 900. According to an embodiment of the invention, the network connection element 900 may have network connectivity software, a local web server, object identifier analysis software, software to transmit the results of an object identifier analysis to a remote server, DHCP software and local permanent storage. According to an embodiment of the invention, the network connection element 900 may also include configuration, service and debug applets to be used in the maintenance and configuration of the object identifier 900.

The network connection element 900, according to an embodiment of the invention, may further be provided with a web server 990. As with the web server 340 of the receiver 300 of location system 100, web server 990 of network connection element 900 is able to provide or receive information or commands. In various embodiments of the invention, the web server 990 may allow for control and configuration of any component of the location system.

According to a further embodiment of the invention, the network connection element 900 may be provided with a network interface 992. The network interface 992, as with the network interface 330 of location system 100, is configured to couple the controller to a network 400. According to an embodiment of the invention, the network interface 992 is adapted to packetize buffered information received and send this information as a group, thereby providing more efficient network usage in some applications.

A further embodiment of the invention provides a database 996 in communication with then controller 910 of the network connection element 900. The database 996 may be provided within the network connection element 900 or may be provided on a network 400. According to alternative embodiment of the invention, the database 996 may be provided within the network connection element 900 and also in direct communication with the network 400.

Figure 7:
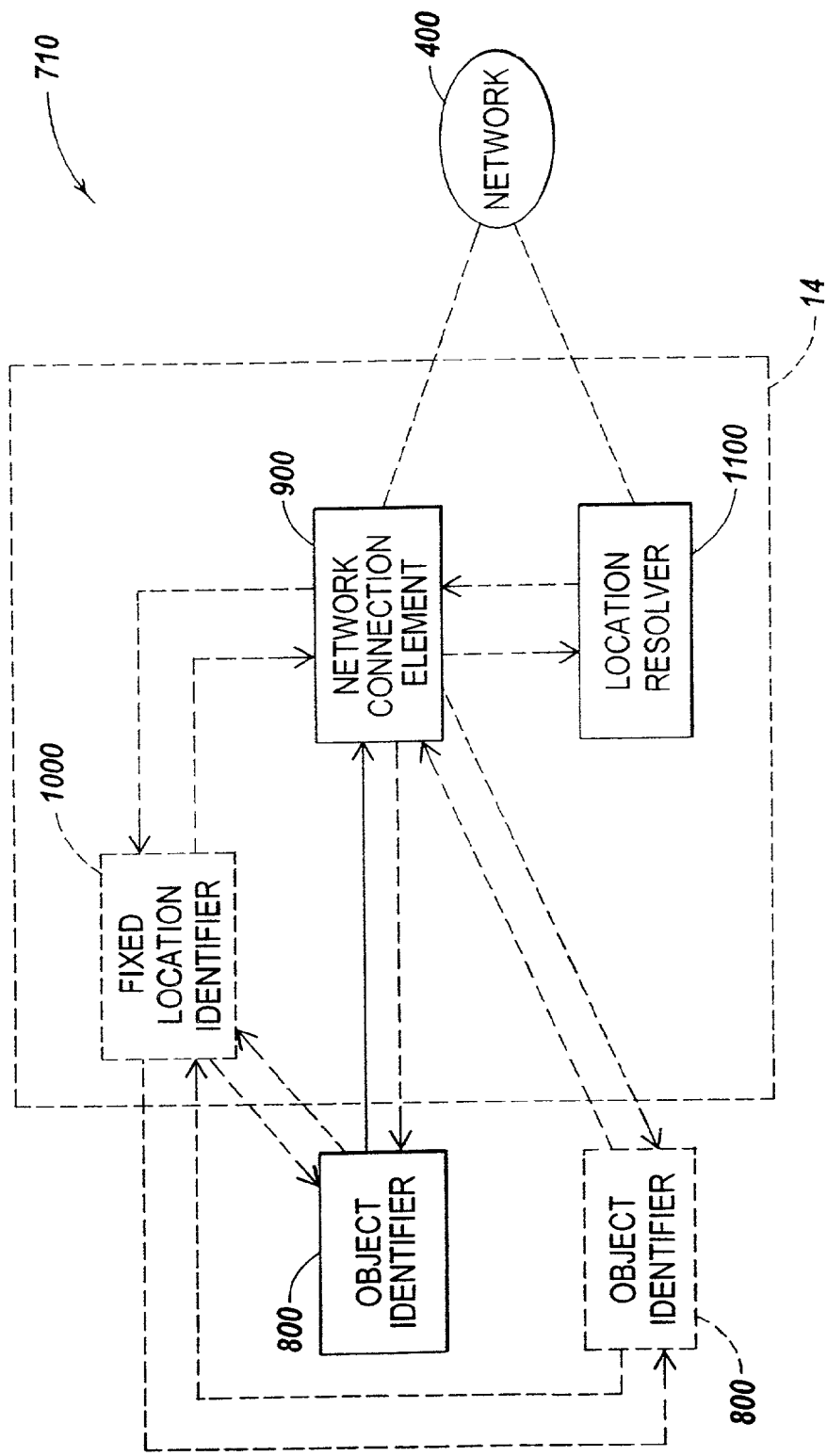
FIG. 7 illustrates a location system, according to a further embodiment of the invention, having a network connection element, one or more object identifiers, a location resolver, and an optional fixed location identifier.

According to a further embodiment of the invention, a location system 710 is illustrated by way of example in FIG. 7. According to this embodiment, a location resolver 1100 is provided for communication with the network connection element 900. In this embodiment, the location resolver 1100 communicates with one or more network connection elements 900 to obtain information pertaining to the location of one or more object identifiers 800 and one or more optional fixed location identifiers 1,000. The location resolver 1100 may be provided in the form of software or hardware or a combination of both. The location resolver 1100 may communicate with one or more network connection elements 900 over a network 400.

As shown by way of example, a location determining module 14, according to an embodiment of the invention, is illustrated, by way of example, as including the network connection element 900, the location resolver 1100 and the fixed location identifier 1000. In this embodiment, the network 400 is not included in the location determining module 14, but optionally communicates with the location determining module 14.

Figure 8:
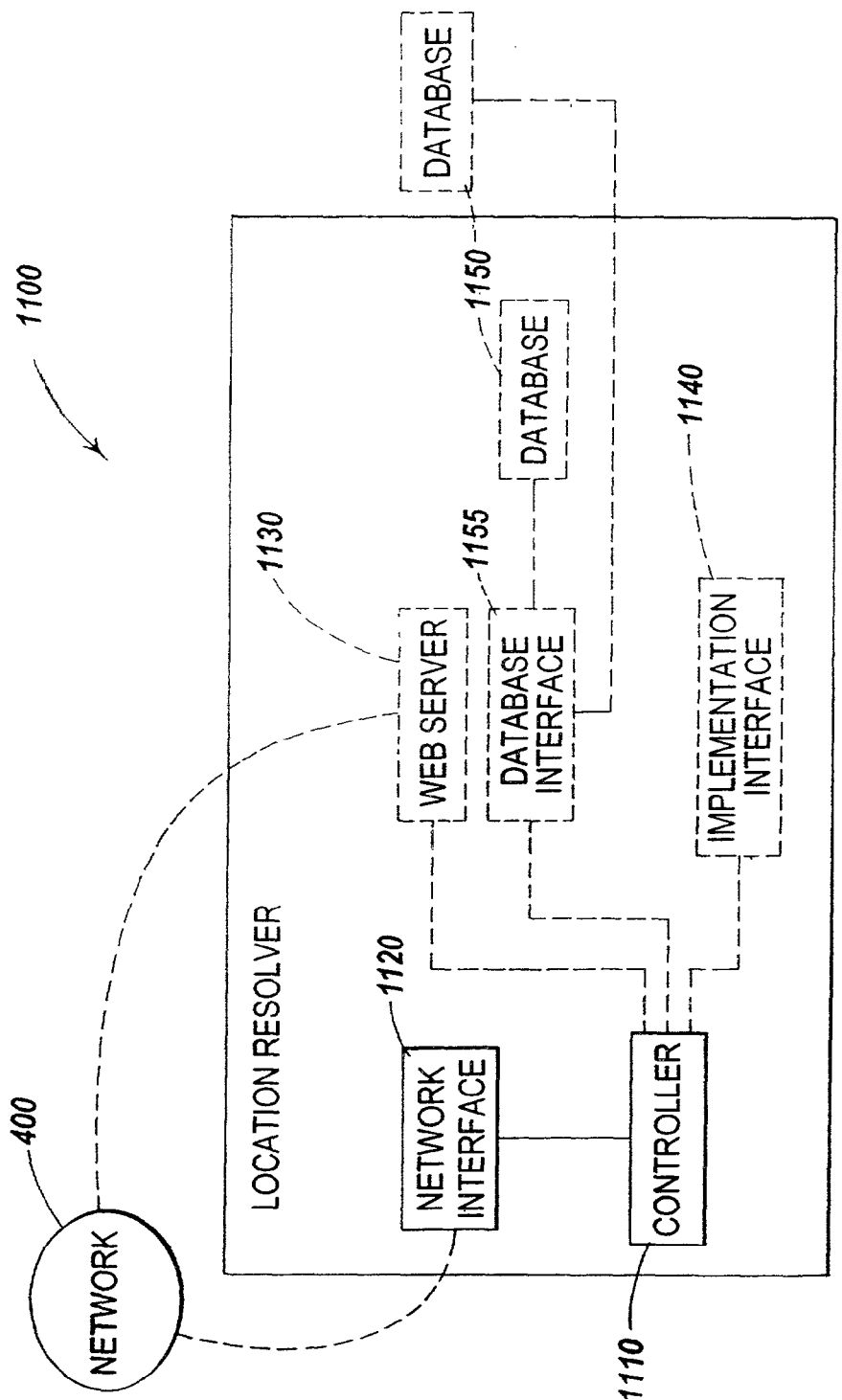
FIG. 8 illustrates a location resolver according to an embodiment of the invention.

The location resolver 1100, according to an embodiment of the invention, is further illustrated by way of example in FIG. 8. As shown in FIG. 8, a controller 1110 is provided in communication with a network interface 1120. The network interface 1120 is adapted to be coupled to the network 400. Controller support may also be optionally provided. A web server 1130 is provided in communication with a controller 1110. The web server 1130 of the location resolver 1100 is similar to the web server 990 of the network connection element 900, discussed herein.

According to an embodiment of the invention, the location resolver 1100 may be provided with a configuration capability to configure other components of the location system. For example, an embodiment of the location resolver 100 may perform some or all of the following functions: reset system time; reset communications; disable all or selected input devices of all or selected components, such as object identifiers, fixed location identifiers, network connection elements; establish and/or cancel associations between all or selected components; establish and/or cancel privacy settings for specific location information; configure network communication protocols; configure receiver and/or transmitter configurations, altering or eliminating signals, signal types, such as RF, IR, ultrasonic, or the like, or transmission frequencies and the frequencies at which transmissions are expected.

An implementation interface 1140 is also provided in communication with controller 1110. The implementation interface 1140 is provided to communicate with other devices in order to allow for the communication of location information and/or initiation or response to commands as described herein. Various examples of implementation interfaces 1140 include XML and SMTP protocols, other examples may be apparent to those of ordinary skill in the art.

A database 1150 is also provided either within the location resolver 1100 or external the location resolver 1100. The database 1150 is adapted to store information relating to the location of one or more object identifiers 800 and/or optional fixed location identifiers 1000 and/or network connection elements 900. According to various embodiments of the invention, the database 1150 may store current and/or previous location and status information of location system components, associations of location system components with each other or locations, privacy protocols and status, topology data indicating locations of some or all location system components relative to each other, or in other descriptive terms, such as room or location names or by a coordinate system.

A database interface 1155 may be provided in another embodiment of the invention in order to facilitate interaction between the database 1150 and the controller 1110. The database interface 1155 may be a network or other hardware or software to controller 1110 to enable the controller 1110 to access the database 1150. Various examples of database interfaces 1155 include JDBC and ODBC, other examples may be apparent to those of ordinary skill in the art.

Figure 9:
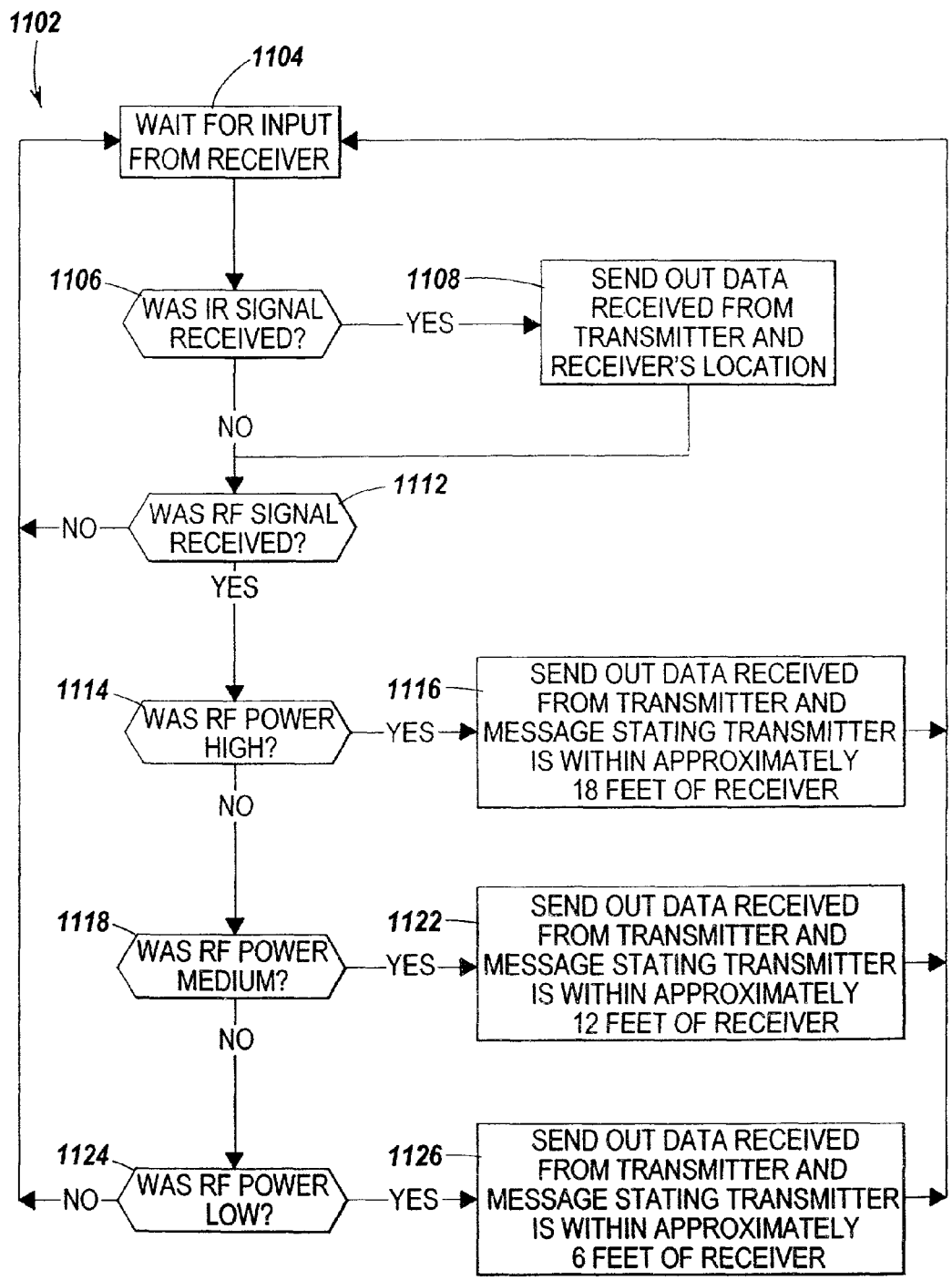
FIG. 9 provides a method of operation of a location resolver according to an embodiment of the invention.

A method 1102 of operation of the location resolver 1100, according to an embodiment of the invention is illustrated in FIG. 9. The location resolver 1100 initially waits for input from a receiver, such as the network connection element 900, step 1104. The location resolver 1100 then determines whether an IR signal was received, step 1106. If an IR signal was received, data received from the transmitter and receivers location is made available, step 1108. If an IR signal is not received the location resolver 1100 checks to see if an RF signal was received, step 1112. Location resolver 1100 also checks to see if an RF signal was received after making any data available from the reception of an IR signal available, step 1108. If an RF signal was not received, the location resolver 1100 according to an embodiment of the invention returns again to wait for further input from the network connection element 900. If an RF signal was received, the location resolver 1100 determines whether the RF power was high, step 1114. If so, data received from the transmitter is made available with message indicating that the object identifier is within a large radius of the network connection element 900, step 1116. If the RF signal power was not high the location resolver 1100 determines whether the RF power was medium, step 118. If so, data received from the object identifier is made available with a message that the object identifier is within a smaller radius of the network connection element 900, step 1122. If the RF signal power was not medium the location resolver 1100 determines whether the RF signal power was low, step 1124. If so data from the object identifier 800 is made available with an indication that the object identifier is within a smaller radius of the network connection element 900, step 1126. The location resolver 1100 then returns to await further input from one or more of the network connection elements 900, step 1104.

It is understood that the method of FIG. 9 may be accomplished by using transmitters that vary in output power or by constant power output transmitters. In using constant power output transmitters, received signal strength is categorized according to signal strength, such as by the use of a histogram. According to an embodiment of the invention, the network connection element 900 classifies signal strength within specific ranges and may pass an indication of the appropriate range to other location system components. According to another embodiment of the invention, the network connection element 900 provides a signal strength value that may be passed to other location system components, such the location resolver 1100, allowing more precise analysis of received signal strength information.

According to one embodiment of the invention, RF and IR signal strength are adjusted to a range of approximately 20 feet. Other embodiments of the invention may involve adjusting signal strength of RF and/or IR and/or other signal types, such as ultrasonic, ranges to a few inches, feet, thousands of feet, or miles. Another embodiment of the invention involves varying signal strength among various types of object identifiers.

A method of operation of the location resolver 1100 involves multilateration. Multilateration determines location by the use of determining range from a relative location. Multilateration can be performed by a single receiver, but is best accomplished by multiple receivers. An object can infer the location of another object by calculating its range from one or more beacons with known locations using some type of signal measurement. According to an embodiment of the invention RF signal strength is used to determine location. According to a further embodiment both RF and IR are used to determine location. It is understood that an absence of a signal that is expected is considered a signal for purposes of determining location. An example, for purposes of illustration, is the receipt of an RF signal but not an IR signal may indicate a transmitter out of IR range but within RF range, or just out of line-of-sight if required for lower-powered IR transmissions. The receiver may be configured to expect both RF and IR transmissions at specific intervals generally or for a specific transmitter. This is one example of the use of both RF and IR for determination of location.

In addition to current signal information, other information may be used in determining location. Previous location information may also be used in determining current location. Locations of other location system components may also be used in determining location. For example, locations of one or more network connection elements 900, one or more fixed location identifiers 1000 and other object identifiers 800 may be used in determining location of a particular location system component. According to one embodiment, establishing relative distances between additional nearby components and the component for which location information is desired assist in establishing a location with greater particularity.

According to an embodiment of the invention, transmission rates may vary among different types of object identifiers. Transmission rates may be adjusted in relation to the type of object for which location information is desired. Examples include low transmission rates for objects typically stationary, such as equipment typically found in a particular room. Whereas people, or mobile equipment may be better tracked by more frequent signal transmissions.

Another method of determining location involves at least one Bayesian network. A further method of determining location involves triangulation. An example of one or more of the foregoing methodologies are described, for example, in U.S. Pat. No. 5,774,876, which is incorporated herein by reference. Bayesian networks are also described in Castro, Paul et al. "A Probabilistic Room Location Service for Wireless Networked Environments" In: Ubicomp 2001: Ubiquitous Computing, Third International Conference, Atlanta, Ga., USA, Sep. 30-Oct. 2, 2001 Proceedings. Edited by G. D. Abowd, et al. Heidelberg, Germany: Springer-Verlag, 2001, LNCS 2201, p. 18 ff. This publication is incorporated herein by reference. Combinations of these methods or other methods of location determination may be apparent to one of ordinary skill in the art and are included within the scope of the invention.

Privacy conditions may be established regarding location information for one or more location system components. Privacy may be accomplished in a variety of ways. For example, privacy may be accomplished by not making location information available or by not determining location information. Privacy may be managed by an opt-out protocol, requiring an action to establish privacy. Privacy may be managed by an opt-in protocol, requiring an action to cancel privacy. A not-opt-out protocol may also be used, preventing action from establishing privacy. Various protocols may be used in combination within a location system. Different location system components may subject to different protocols. Examples include various groups of object identifiers being subject to different protocols, such as some people able to select a privacy protocol or a privacy status, such as privacy or no privacy, while object identifiers used to locate equipment may be subject to a not-opt-out protocol. According to an embodiment of the invention, protocols or privacy status may be assigned through a batch-processing capability in a user interface. According to another embodiment, privacy status for opt-in or opt-out protocols may be accomplished by an input device incorporated in the location system component. Optionally, privacy status may be confirmed by an indicator incorporated in the location system component.

Associations associating objects with other objects or with locations may be established. Examples of the use of associations include: determining procedure times, room utilization, proximity alerts that may be used to alert a fall of a person, regulatory compliance, person & equipment associations; location & equipment associations; friend & foe associations, and automatic billing. According to an embodiment of the invention, association information may be stored in a database. Associations may be performed through a batch-processing capability in a user interface. According to another embodiment, associations may be accomplished by an input device incorporated in the location system component. Optionally, association status may be confirmed by an indicator incorporated in the location system component. One example involves activating an input device on an object identifier, fixed location identifier or network connection element. An indicator indicates, such as by an LED or sound, that association can be performed. An input device may then be activated within a limited time on another location system component, such as an object identifier, to establish an association between the components.

Events or actions may be initiated based on location information association information or input device status, or changes in any of these. One example involves sending information in response to an object identifier being within a range of locations or a specific location. An example includes paging a doctor when a specific patient enters a treatment area. Other examples of actions include entering information in a database, sending XML data containing the current location data and status of a location system component onto the network. An example is the use of a cardiac monitoring application typically used in a health care institution for receiving a report of a cardiac arrest. The term health care institution, as used herein, includes a wide variety of facilities associated with providing health care or services. Examples include hospitals, managed care facilities, assisted care facilities and clinics. The location system according to an embodiment of the invention may be configured to receive a request for the location of a particular patient, or the cardiac monitoring equipment sounding the alarm. The location system can then automatically reply with location information to assist health care institution staff in locating the patient in need. A similar example could use the activation of an input device on an object identifier as a distress call by a patient, with the alert and location information forwarded to a health care institution communication system for prompt attention by health care institution staff. One embodiment of the invention may interface with a Winegard interface to unlock a door, or activate other security equipment, in response to location information or input device status. Other examples include pages, WAP messages, sending e-mails and activating or canceling alarms.

According to an embodiment of the invention, the components of the location system do not retransmit signals if they are not received. By waiting until the next scheduled transmission, transmissions throughout the location system area are reduced and interference difficulties are reduced.

Figure 10:
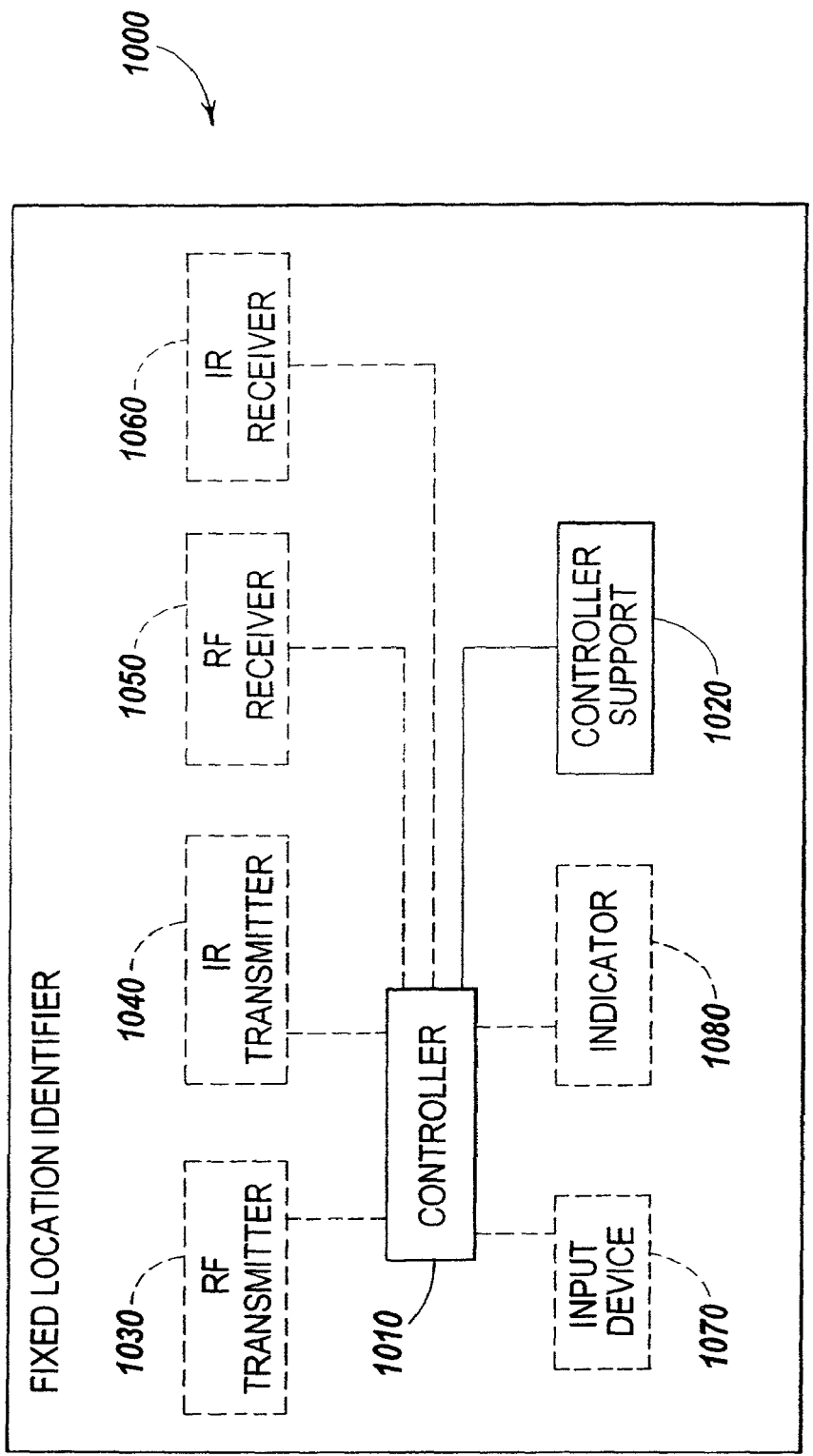
FIG. 10 illustrates a fixed location identifier according to an embodiment of the invention.

The fixed location identifier 1000, according to an embodiment of the invention is illustrated by way of example in FIG. 10. The fixed location identifier 1000 is similar to the object identifier 800 illustrated and described in relation to FIG. 3. A controller 1010 is provided in communication with controller support 1020. RF and IR transmitters and receivers 1030, 1040, 1050, 1060 may be provided individually or in combination according to various embodiments of the invention. An input device 1070 and indicator 1080 may also each or both be included in various embodiments of the invention. The fixed location identifier 1000 is configured to receive signals from one or more object identifiers 800, and/or other fixed location identifiers 1000, and retransmit these signals to a network connection element 900 along with identifying information to designate which of the fixed location identifiers 1000 is retransmitting the information. Additional information relating to the retransmitting fixed location identifier 1000 may also be appended, such as battery information or other status information allowing remote monitoring of the fixed location identifier 1000.

According to various embodiments of the invention, the fixed location identifier 1000 may be provided with input devices 1070 or indicators 1080 to enable input information or various signaling functionality. Fixed location identifiers 1000 do not need to be coupled to other components by the use of wiring or other infrastructure. Therefore, the use of fixed location identifiers 1000 enable a location system to be implemented with fewer network connection elements, as fixed location identifiers can provide additional information as to the location of object identifiers 800. Furthermore, fixed location identifiers 1000, can extend the range of network connection elements 900 by providing an optional higher power transmission signal to reach network connection elements 900 at ranges that object identifiers 800 may be incapable of reaching.

The network connection element 900 is adapted to receive signals from the fixed location identifier 1000 as described above in relation to signals from the object identifier 800. According to an embodiment of the invention, the network connection element 900 contains hardware and software capable of receiving signals from the fixed location identifier 1000. According to an embodiment of the invention, the network connection element 900 may have network connectivity software, a local web server, fixed location identifier software, software to transmit the results of a fixed location identifier analysis to a remote server, DHCP software and local permanent storage. According to an embodiment of the invention, the network connection element 900 may also include configuration, service and debug applets to be used in the maintenance and configuration of the fixed location identifier 1000.

Figure 11:
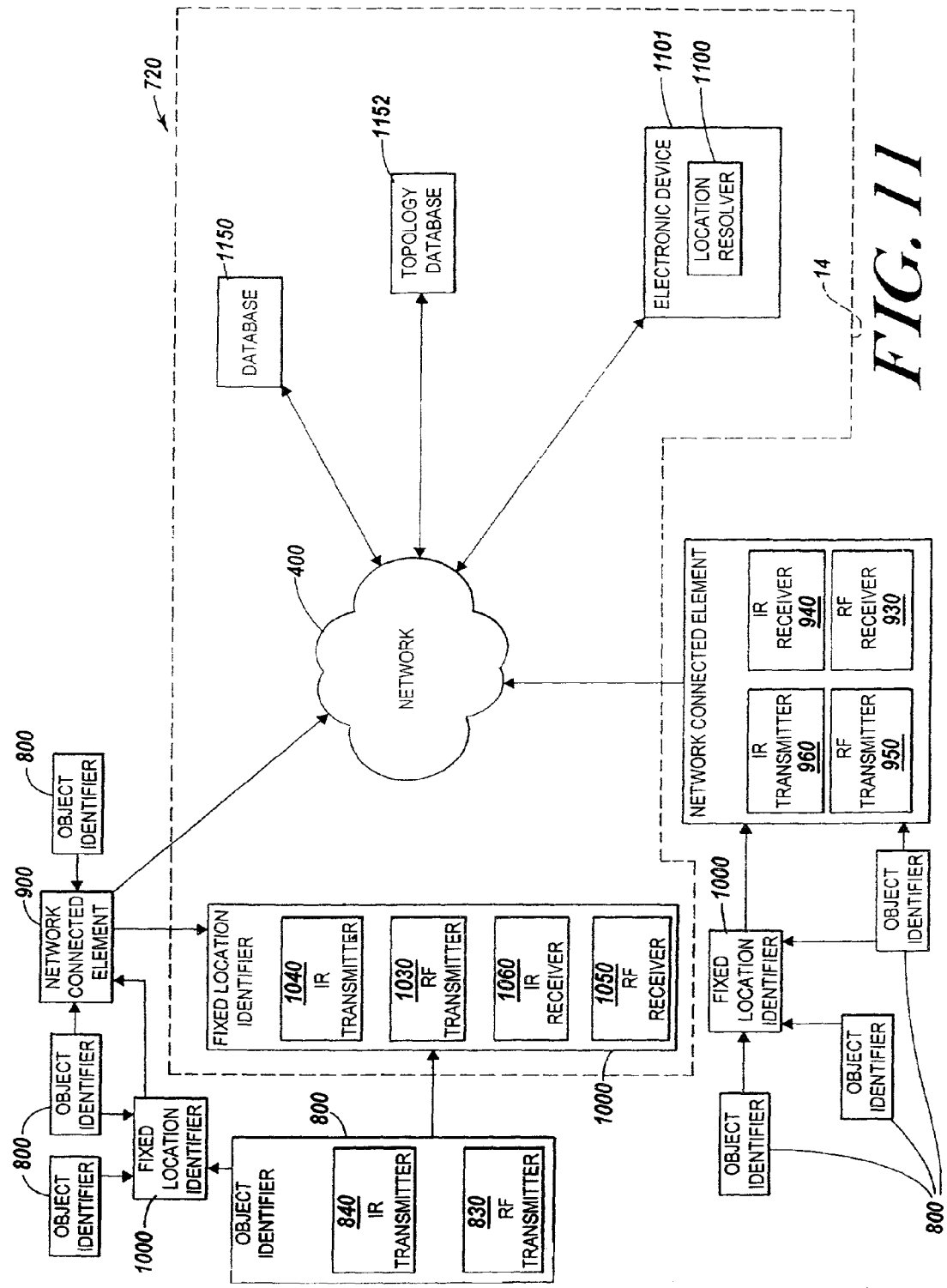
FIG. 11 illustrates a location system according to a further embodiment of the invention.

A location system 720, according to a further embodiment of the invention, is illustrated by way of example in FIG. 11. The location system 720 includes various object identifiers 800, network connection elements 900 and fixed location identifiers 1000. A network 400 is illustrated along with a database 1150 and location resolver 1100. According to the present embodiment, a topology database 1152 is separately provided from the database 1150. The topology database 1152 may be provided with information pertaining to the locations of network connection elements 900 and fixed location elements 900 and fixed location identifiers 1000. Such topology information allows for more descriptive data to be provided regarding the location of object identifiers 800. For example, the location of a fixed location identifier 1000 or network connection element 900 may be specified as a particular office, hallway or area. Therefore, if an object identifier 800 is identified as within a small radius of a fixed location identifier 1000 or network connection element 900, the object identifier 800 may be identified as being within specific room, office or area.

An electronic device 1101 is provided to host the location resolver 1100. According to this embodiment the location resolver 1100 is in the form of software operating on the electronic device 1101. Examples of electronic devices 1101 include computers, processors or other devices capable of implementing the functionality of the location resolver 1100.

As shown by way of example, a location determining module 14, according to an embodiment of the invention, is illustrated, by way of example, as including one of the fixed location identifiers 1000, the network 400, the electronic device 1101, the location resolver 1100, the database 1150 and topology database 1152.

Figure 12:
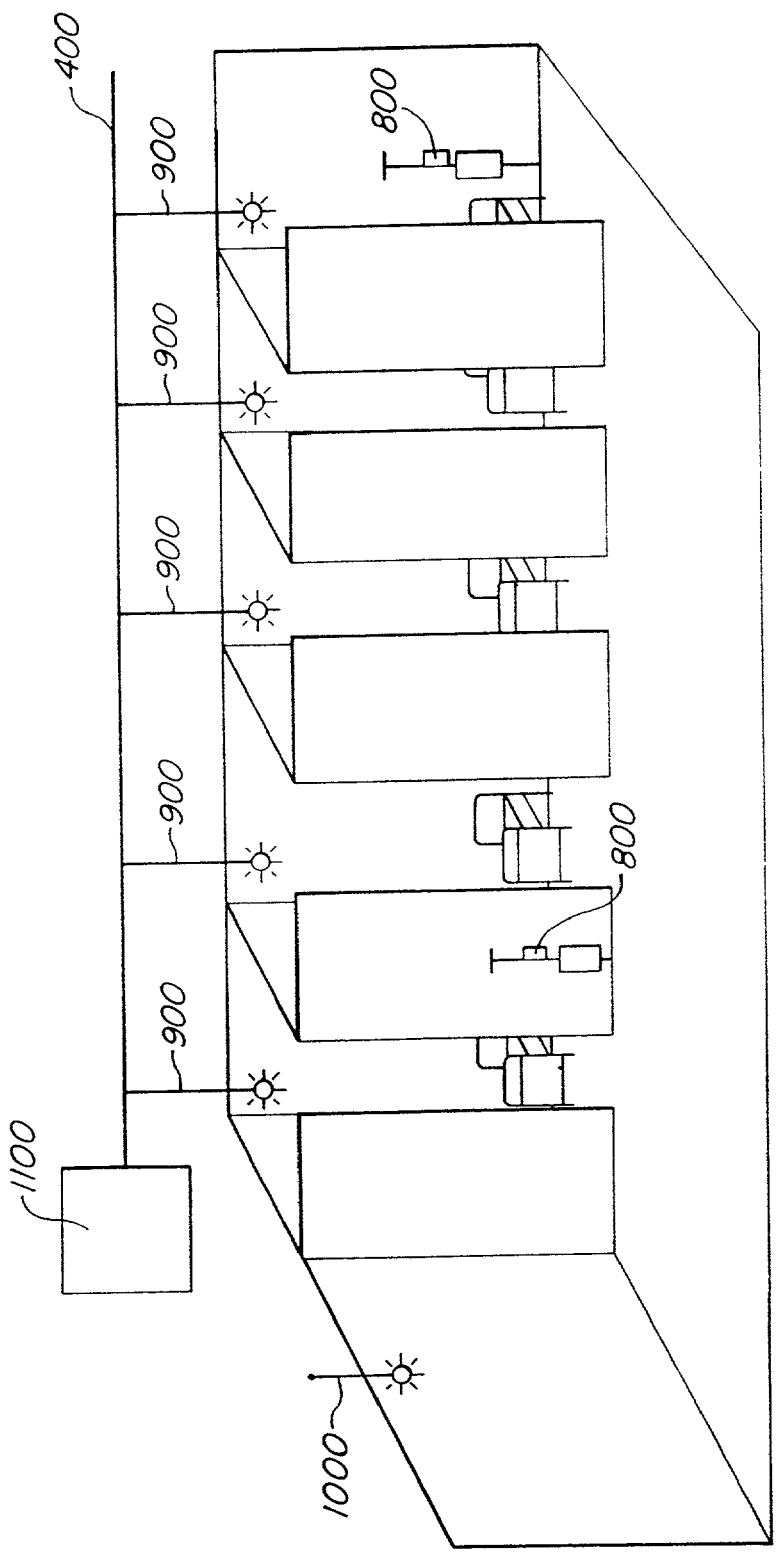
FIG. 12 provides a perspective view of a location system installed at a location according to a further embodiment of the invention.

An example of a location system in use in a health care institution setting is illustrated in FIG. 12. As shown by way of example in FIG. 12, a network 400 is provided to allow for communication among multiple network connection elements 900. A location resolver 1100 is also provided in communication is also provided in communication with the network 400. It is noted that the network is not limited to a wired network, as the network may be a wireless network. A fixed location identifier 1000 is illustrated and is in communication with the network connection elements 900. Various object identifiers 800 are illustrated as a fixed to various pieces of equipment within the health care institution setting. The object identifiers 800 may be in communication with one or more of each of the network connection elements 900 and the fixed location identifier 1000.

Figure 13:
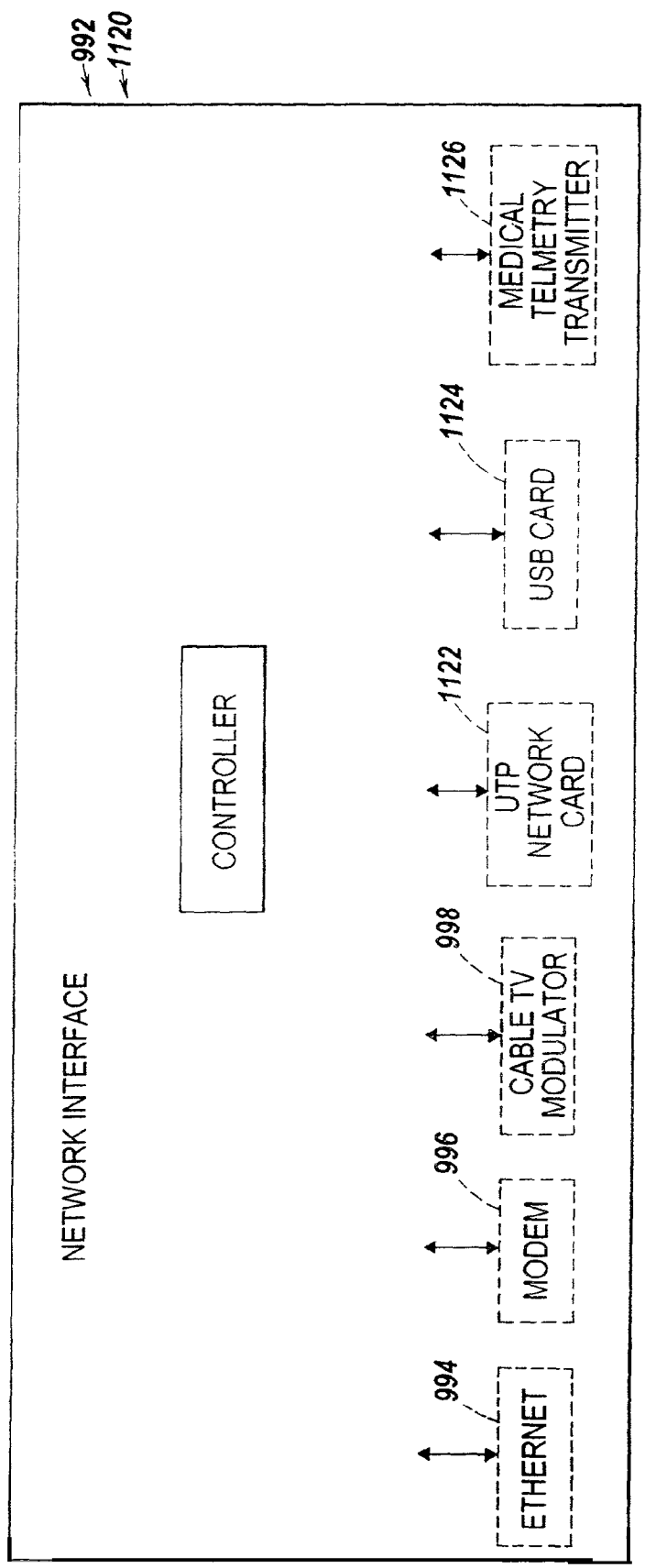
FIG. 13 illustrates a network interface for use in a network connection element or a location resolver according to an embodiment of the invention

As illustrated in FIG. 13, a network interface 992, 1120 is shown by way of example according to an embodiment of the invention. The network interface 992, 1120 may be used in one or more of the network connection elements 900 and/or location resolver 1100 or other components adapted for communication with a network. A network interface 992, 1120 is adapted to be directly coupled to a network. The network interface 992, 1120 may be configured with one or more of the appropriate configurations for the corresponding networks. For example, it is illustrated by way of example in FIG. 13, the network interface 992, 1120 may be configured to be directly to an Ethernet network by way of Ethernet circuitry 994. According to a further embodiment, the network interface 992, 1120 may be coupled to a telephone system to a modem 996. According to another embodiment of the invention, the network interface 992, 1120 may be provided with one or more of a cable television modulator 998 to allow communication with a cable T.V. network, a UTP network card 1122, to allow communication with a UTP network, or a universal serial bus (USB) card 1124 and/or a medical telemetry transmitter 1126 for communication with a medical telemetry network.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

What is claimed is:

1. A location system, comprising:
a transmitter (TXR) configured to transmit a transmitter location signal (TXLOCSIG) comprising a transmitter identifier (TXID) corresponding to said transmitter, said transmitter location signal transmitted using at least two transmission mediums comprising an infrared (IR) medium and a radio frequency (RF) medium such that said transmitter transmits at least a part of said transmitter location signal in IR as an IR transmitter location signal (IRTXLOCSIG) and at least a part of said transmitter location signal in RF as an RF transmitter location signal (RFTXLOCSIG);
a fixed location identifier (FLI) configured to receive said IR transmitter location signal and said RF transmitter location signal from said transmitter in IR and RF, respectively, and retransmit said transmitter location signal using RF in an RF-only transmitter location signal (RFONLY); and
a receiver (RCVR) configured to receive said transmitter location signal from said fixed location identifier from said RF-only transmitter location signal and to receive said transmitter location signal from said RF transmitter location signal and said IR transmitter location signal, said receiver including a receiver-network interface (RCVRNET) configured to directly couple said receiver to a network,
wherein said transmitter identifier in said transmitter location signal is used to determine, in said RCVR, a transmitter location (TXLOC) of said transmitter to transmit over said network,
wherein said transmitter identifier in said transmitter location signal is used to determine, in said receiver, a receiver location (RCVRLOC) of said receiver, and
wherein said RCVR receives said RFTXLOCSIG, said IRTXLOCSIG, and said RFONLY signals and constructs said TXLOC of said TXR and said RCVRLOC of said RCVR from said TXID within said TXLOCSIG which is conveyed by said RFTXLOCSIG, said IRTXLOCSIG, and said RFONLY signals.

2. The location system of claim 1, wherein said receiver further comprises a web server configured to provide information to said network.

3. The location system of claim 1, wherein said interface is a modem.

4. The location system of claim 1, wherein said interface is a cable TV modulator.

5. The location system of claim 1, wherein said interface is a UTP network card.

6. The location system of claim 1, wherein said interface is a USB card.

7. The location system of claim 1, wherein said receiver is configured to receive said location signal from said fixed location identifier.

8. The location system of claim 1, wherein said transmitter is further configured to receive at least one signal.

9. The location system of claim 1, wherein said transmitter is an object identifier.

10. The location system of claim 1, further comprising a location resolver, whereby components are configured.

11. The location system of claim 1, wherein a location determining module establishes an association between a first object identifier and a second object identifier.

12. The location system of claim 10, wherein said location resolver is adapted to initiate an event.

13. The location system of claim 10, wherein said location resolver is configured to trigger events based on locations of object identifiers.

14. The location system of claim 2, wherein said web server is configured to run a configuration applet, a service applet and a debug applet.

15. A location system comprising:
a transmitter (TXR) configured to transmit a transmitter location signal (TXLOCSIG) comprising a transmitter identifier (TXID) corresponding to said transmitter, said transmitter location signal transmitted using at least two transmission mediums comprising an infrared (IR) medium and a radio frequency (RF) medium such that said transmitter transmits at least a part of said transmitter location signal in IR as an IR transmitter location signal (IRTXLOCSIG) and at least a part of said transmitter location signal in RF as an RF transmitter location signal (RFTXLOCSIG);
a fixed location identifier (FLI) configured to receive said IR transmitter location signal and said RF transmitter location signal from said transmitter in IR and RF, respectively, and retransmit said transmitter location signal using RF in an RF-only transmitter location signal (RFONLY); and
a receiver (RCVR) configured to receive said transmitter location signal from said fixed location identifier from said RF-only transmitter location signal and to receive said transmitter location signal from said RF transmitter location signal and said IR transmitter location signal, said receiver including a receiver-network interface (RCVRNET) configured to directly couple said receiver to a network,
wherein said transmitter identifier in said transmitter location signal is used to determine, in said RCVR, a transmitter location (TXLOC) of said transmitter to transmit over said network,
wherein said transmitter identifier in said transmitter location signal is used to determine, in said receiver, a receiver location (RCVRLOC) of said receiver,
wherein said RCVR receives said RFTXLOCSIG, said IRTXLOCSIG, and said RFONLY signals and constructs said TXLOC of said TXR and said RCVRLOC of said RCVR from said TXID within said TXLOCSIG which is conveyed by said RFTXLOCSIG, said IRTXLOCSIG, and said RFONLY signals,
wherein said TXR is an object identifier, and
wherein said fixed location identifier is adapted to receive a first RF transmitter location signal and a first IR transmitter location signal from said object identifier, append a fixed location identifier identification attribute, and transmit a second RF transmitter location signal and a second IR transmitter location signal to a network connection element for determination of a location of at least one of a group of said object identifier and said network connection element.

16. The location system of claim 15, wherein at least one of said group of said object identifier and said fixed location identifier transmits an RF transmission repetition rate.

17. The location system of claim 15, wherein at least one of said group of said object identifier and said fixed location identifier transmits an IR transmission repetition rate.

* * * * *